United States Patent
Sugiyama et al.

(10) Patent No.: US 6,721,085 B2
(45) Date of Patent: Apr. 13, 2004

(54) OPTICAL MODULATOR AND DESIGN METHOD THEREFOR

(75) Inventors: Masaki Sugiyama, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/233,471

(22) Filed: Sep. 4, 2002

(65) Prior Publication Data

US 2003/0169478 A1 Sep. 11, 2003

(30) Foreign Application Priority Data

Mar. 7, 2002 (JP) ........................................ 2002-062095

(51) Int. Cl.[7] .............................. G02F 1/00; G02F 1/035
(52) U.S. Cl. ................................ 359/322; 385/2; 385/3
(58) Field of Search ................................ 359/321, 322; 385/2, 3

(56) References Cited

U.S. PATENT DOCUMENTS

| | | | |
|---|---|---|---|
| 6,304,685 B1 | 10/2001 | Burns ........................... | 385/3 |
| 6,580,843 B2 * | 6/2003 | Doi et al. ...................... | 385/14 |
| 6,584,240 B2 * | 6/2003 | Doi et al. ...................... | 385/2 |
| 2003/0169478 A1 * | 9/2003 | Sugiyama et al. .......... | 359/321 |

OTHER PUBLICATIONS

Madabhushi, R, "Microwave Attenuation Reduction Techniques for Wide–Band Ti:LiNbO$_3$Optical Modulators," IEICE Trans. Electron, vol. E81–C, No. 8, Aug. 1998, pp. 1321–1327.

Noguchi, K., et al., "Low–voltage and broadband Ti:LiNbO$_3$ modulators operating in the millimeter wavelength region," OFC '96 Technical Digest, pp. 205–206.

Noguchi, K., et al., "Characteristics of ridged Ti:LiNbO$_3$ optical modulator," Proceedings of the 1992 IEICE Spring Conference, Tokyo, Japan, Mar. 24–27, C–206, with English translation.

Burns, W.K., et al., "Low Drive Voltage, Broad–Band LiNbO$_3$ Modulators With and Without Etched Ridges," Journal of Lightwave Technology, vol. 17, No. 12, Dec. 1999, pp. 2551–2555.

Noguchi, K., et al., "Push–Pull Type Ti:LiNbO$_3$ Optical Modulator for 40 Gb/s Optical Transmission Systems," Proceedings of the 1999 IEICE General Conference, Keio University, Yokohama, Japan, Mar. 25–28, 1999, C–3–126, p. 280, with English translation.

Kawano, K., et al., "Consideration on High–Speed and Wide–Band Optical Modulators," 1998 Autumn National Convention Record, IEICE, Sep. 6–9, 1988, C–195, with English Translation.

Noguchi, K., et al., "Push–Pull Type Ridged Ti:LiNbO3 Optical Modulator," IEICE Trans. Electron., vol. E79–C, No. 1, Jan. 1996, pp. 27–31.

Noguchi, K., et al., "40–Gbit/s Ti:LiNbO$_3$ Optical Modulator with a Two–Stage Electrode," IEICE Trans. Electron., vol. E81–C, No. 8, Aug. 1998, pp. 1316–1320.

Sugiyama, Masak, et al., "Driver–less 40 Gb/s LiNbO$_3$ Modulator with Sub–1 V Drive Voltage," OFC 2002, Mar. 17, 2002.

* cited by examiner

*Primary Examiner*—Georgia Epps
*Assistant Examiner*—David N. Spector
(74) *Attorney, Agent, or Firm*—Staas & Halsey LLP

(57) ABSTRACT

A high-speed, high-performance optical modulator operating with a reduced drive voltage without sacrificing modulation bandwidth. The modulator has an optical waveguide fabricated on a crystal substrate. A signal electrode is on a ridge on the substrate. Ground electrodes are formed on both sides of the signal electrode. A gap between the signal and ground electrodes is at least 44 $\mu$m, and an interaction length of the signal electrode is at least 41 mm. The modulator can operate at 40 Gbps or higher.

83 Claims, 27 Drawing Sheets

OPTICAL MODULATOR AND DESIGN METHOD THEREFOR

CROSS-REFERENCE TO RELATED APPLICATIONS

This application is based on, and claims priority to, Japanese Application No. 2002-062095, filed Mar. 7, 2002, in Japan, and which is incorporated herein by reference.

BACKGROUND OF THE INVENTION

1. Field of the Invention

The present invention relates to an optical modulator and a design method therefor. More particularly, the present invention relates to an optical modulator that utilizes an electro-optic effect of a crystal substrate. The invention also relates to a method of designing an optical modulator which performs electrical-to-optical conversion by modulating a given light beam with an electrical signal.

2. Description of the Related Art

Recent years have seen an increasing use of multimedia applications, with a growing awareness of demands for more advanced optical communications networks that provide higher speeds and larger bandwidths. Optical modulators are one of the key devices for realizing such high-performance optical networks. One type of optical modulator is an external modulator, which performs electrical-to-optical conversion by modulating an incoming light beam with an electrical signal. The modulating signal produces an electric field across an optical waveguide fabricated on a substrate, so that the light beam propagating along the waveguide will be varied in phase as a result of interaction between the light and the electric field being applied to it.

To meet the recent demand for high-speed, high-bandwidth optical communication, technological migration from 10 Gbps-class systems to 40 Gbps-class systems has begun, including the deployment of dense wavelength-division multiplexed (DWDM) optical transmission systems. The new systems require optical modulators to operate four times faster than before. To fulfill this requirement, it is necessary to reduce the drive voltage of modulators since high-speed electronic circuits cannot produce a large voltage swing.

In designing such an external optical modulator as mentioned above, however, we trade off faster operating rates (or wider modulation bandwidths) against lower drive voltages. In general, we can increase the modulation rates if the electric capacitance is small. This would be accomplished by simply cutting the length of the optical waveguide (or actually, reducing the length of a signal electrode that makes a modulating electric field interact with the light beam traveling on the optical waveguide). The reduction of this "interaction length," however, also reduces the amount of resulting phase displacements, causing a decreased modulation ratio. Contrary to our desire for a lower drive voltage, we now have to increase the drive voltage to yield a sufficient modulation depth. For this reason, there have been difficulties in further improving the performance of conventional optical modulators or reducing the drive voltage for optical modulators.

SUMMARY OF THE INVENTION

In view of the foregoing, it is an object of the present invention to provide a high-speed, high-performance optical modulator which operates with a reduced drive voltage without sacrificing its modulation bandwidth.

It is another object of the present invention to provide a method to design a high-speed, high-performance optical modulator which operates with a reduced drive voltage without sacrificing its modulation bandwidth.

To accomplish the objects stated above, according to the present invention, there is provided an optical modulator including an optical waveguide fabricated on a crystal substrate that exhibits an electro-optic effect; a signal electrode placed in the vicinity of the optical waveguide; and ground electrodes formed on both sides of the signal electrode. The characteristic impedance of the signal electrode is set within a range where microwave reflection is limited below a predetermined level. The light beam traveling along the optical waveguide is phase-matched with a microwave signal traveling along the signal electrode. The gap between the signal electrode and ground electrodes is at least 44 μm, while the interaction length of the signal electrode is at least 41 mm. With such a setup, the light beam can be modulated at a rate of 40 Gbps or higher.

Objects of the present invention are achieved by providing an optical modulator including (a) a ridge; (b) a signal electrode on the ridge, the signal electrode having an interaction length which is at least 41 mm; and (c) a ground electrode. A gap width between the ground electrode and the signal electrode is at least 44 μm.

Objects of the present invention are also achieved by providing an optical modulator for optically modulating a light, the optical modulator including (a) a substrate; (b) an optical waveguide through which the light travels; (c) a ridge changing an elevation of the optical waveguide with respect to the substrate; (d) a ground electrode; and (e) a signal electrode on the ridge. A gap width between the ground electrode and the signal electrode is at least 44 μm. The signal electrode has an interaction length with respect to the optical waveguide of at least 41 mm. A drive signal supplied to the signal electrode causes an electric field to be produced along the optical waveguide as the light travels through the optical waveguide, to optically modulate the light.

Moreover, objects of the present invention are achieved by providing an optical modulator for optically modulating a light, the optical modulator including (a) a substrate; (b) an optical waveguide through which the light travels; (c) a ridge changing an elevation of the optical waveguide with respect to the substrate; (d) first and second ground electrodes; and (e) a signal electrode on the ridge and positioned between the first and second ground electrodes. A gap width between the first ground electrode and the signal electrode, and between the second ground electrode and the signal electrode, is at least 44 μm. The signal electrode has an interaction length with respect to the optical waveguide of at least 41 mm. A drive signal supplied to the signal electrode causes an electric field to be produced along the optical waveguide as the light travels through the optical waveguide, to optically modulate the light.

Objects of the present invention are also achieved by providing an optical modulator for optically modulating a light, the optical modulator including (a) a z-cut LiNbO$_3$ substrate; (b) an optical waveguide through which the light travels; (c) a ridge changing an elevation of the optical waveguide with respect to the substrate; (d) first and second ground electrodes; and (e) a signal electrode on the ridge and positioned between the first and second ground electrodes. A gap width between the first ground electrode and the signal electrode, and between the second ground electrode and the signal electrode, is at least 44 μm. The signal electrode has an interaction length with respect to the optical waveguide of at least 41 mm. A buffer layer is between the signal electrode and the ridge. A drive signal supplied to the signal electrode causes an electric field to be produced along the optical waveguide as the light travels through the optical waveguide, to optically modulate the light.

In addition, objects of the present invention are achieved by providing an optical modulator including (a) a crystal substrate that exhibits an electro-optic effect; (b) an optical waveguide through which a light travels; (c) a ridge changing an elevation of the optical waveguide with respect to the substrate; (d) first and second ground electrodes; and (e) a signal electrode on the ridge and between the first and second ground electrodes. A gap width between the signal electrode and the first ground electrode, and between the signal electrode and the second ground electrode, is at least 44 μm. The signal electrode has an interaction length with respect to the optical waveguide of at least 41 mm. The light traveling through the optical waveguide is phase-matched with a microwave signal traveling through the signal electrode. Characteristic impedance of the signal electrode is set within a range where microwave reflection is limited below a predetermined level.

Objects of the present invention are further achieved by providing an optical modulator including (a) a z-cut $LiNbO_3$ substrate; (b) an optical waveguide through which a light travels; (c) a ridge changing an elevation of the optical waveguide with respect to the substrate; (d) first and second ground electrodes; and (e) a signal electrode on the ridge and between the first and second ground electrodes. A gap width between the signal electrode and the first ground electrode, and between the signal electrode and the second ground electrode, is at least 44 μm. The signal electrode has an interaction length with respect to the optical waveguide of at least 41 mm. A buffer layer is between the signal electrode and the ridge. The light traveling through the optical waveguide is phase-matched with a microwave signal traveling through the signal electrode. Characteristic impedance of the signal electrode is set within a range where microwave reflection is limited below a predetermined level.

Objects of the present invention are achieved by providing a 40 Gbps optical modulator including (a) a substrate; (b) a signal electrode formed on the substrate, the signal electrode having a base with a width W; and (c) a ground electrode. A gap width S exists between the ground electrode and the signal electrode. The ratio S/W is greater than or equal to 8.

Objects of the present invention are further achieved by providing a 40 Gbps optical modulator including (a) a substrate; (b) first and second ground electrodes formed on the substrate; and (c) a signal electrode formed on the substrate between the first and second ground electrodes. A gap width S exists between the first ground electrode and the signal electrode, and between the second ground electrode and the signal electrode. The signal electrode has a base with a width W. The ratio S/W is greater than or equal to 8.

Objects of the present invention are also achieved by providing a method of designing an optical modulator which performs electrical-to-optical conversion by modulating a light beam with a microwave signal. The method includes (a) defining an allowable range of characteristic impedance within which microwave reflection is limited below a predetermined level; (b) performing phase matching by making effective refraction index for the microwave signal agree with that for the light beam; (c) defining a first relationship that associates the thickness of ground electrodes with the width of a gap between a signal electrode and the ground electrodes, based on a result of said phase matching step (b); (d) defining a second relationship that associates ground electrode thickness with the gap width within the allowable range; (e) determining an acceptable range of the gap width and the ground electrode thickness, based on the first and second relationships; (f) plotting the driving voltage and an interaction length of the signal electrode within the acceptable range; and (g) obtaining optimal values of the gap width, interaction length, drive voltage, and ground electrode thickness by increasing the gap width together with the interaction length to reduce the drive voltage and loss of high-frequency components of the microwave signal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 18 and 19 show the relationship between the gap width and ground electrode thickness, according to an embodiment of the present invention;

DESCRIPTION OF THE PREFERRED EMBODIMENTS

Figure 1:
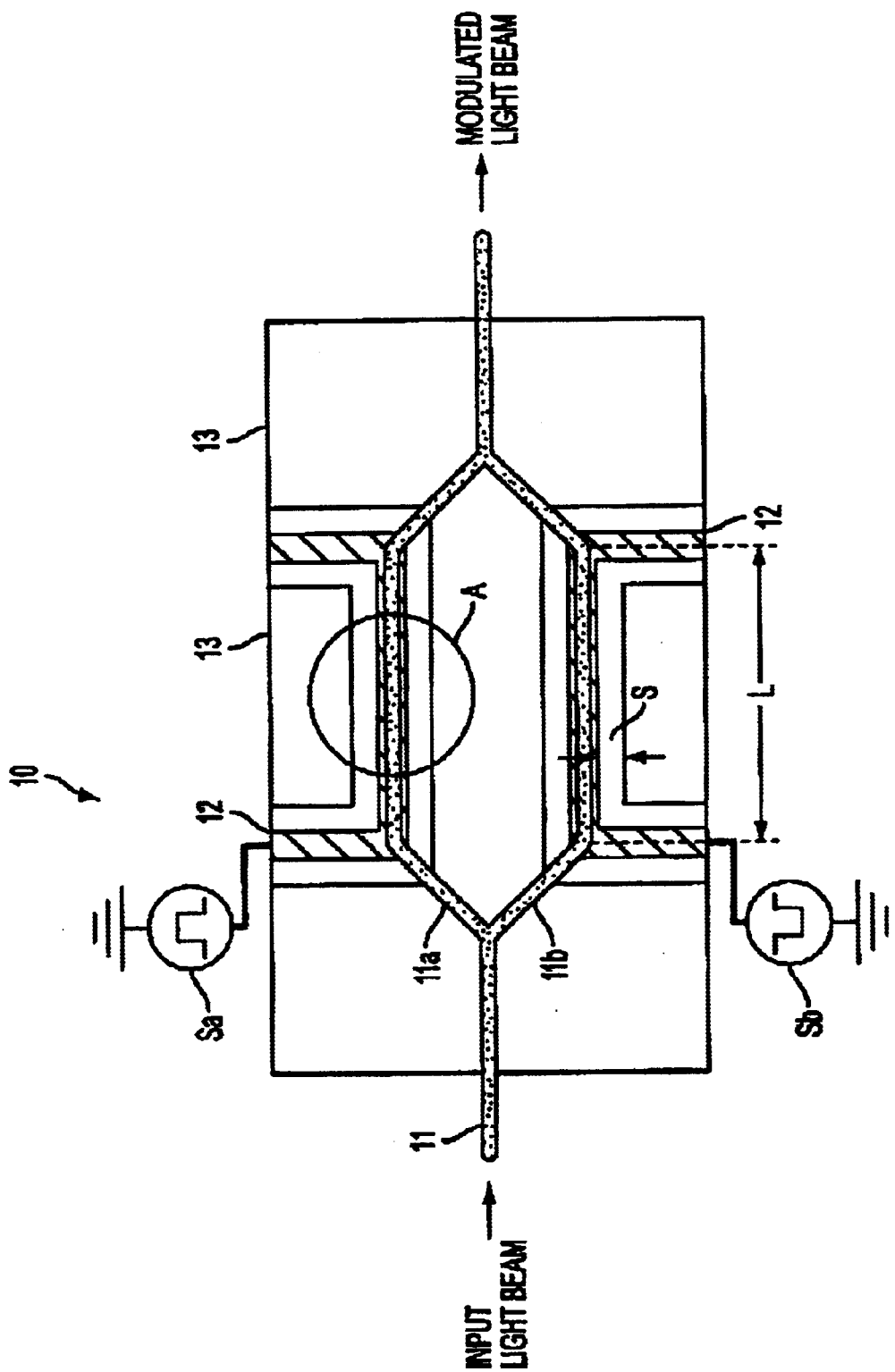
FIG. 1 is a plan view of an optical modulator, according to an embodiment of the present invention.

Preferred embodiments of the present invention will be described below with reference to the accompanying drawings, wherein like reference numerals refer to like elements throughout.

Figure 2:
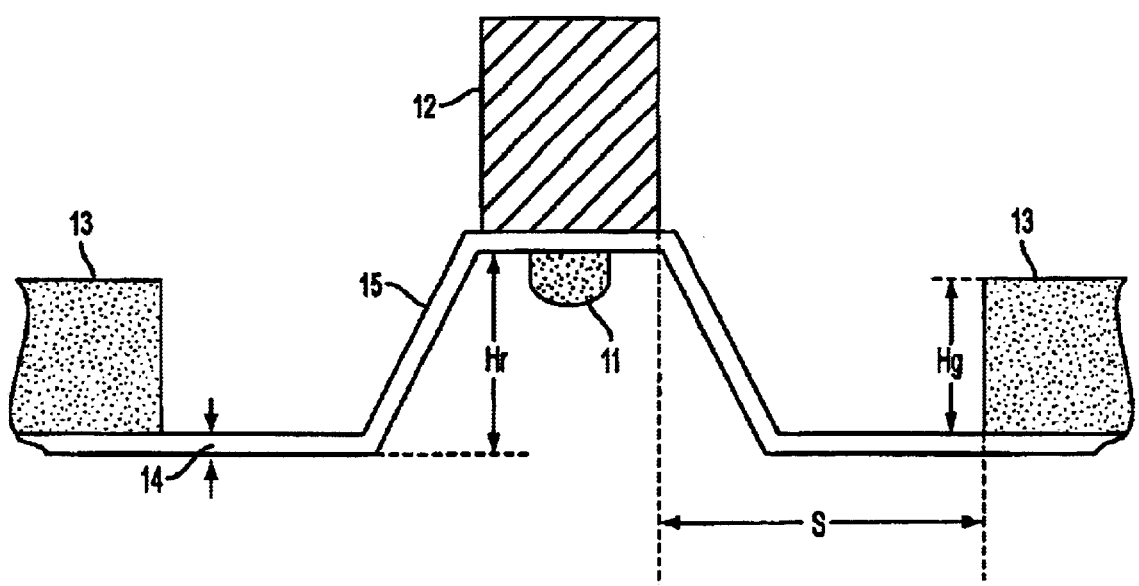
FIG. 2 shows a cross section at part A of the optical modulator in FIG. 1, according to an embodiment of the present invention.

FIG. 1 is a plan view of a dual-drive optical modulator 10 according to the present invention, and FIG. 2 shows a cross-section at part A of the modulator 10. The illustrated optical modulator 10 is based on a Mach-Zehnder interferometer arrangement. An optical waveguide 11 is formed on a crystal substrate of LiNbO$_3$ (lithium niobate, hereafter shortened to "LN"). Lithium niobate exhibits an electro-optic effect, whose refractive index is varied by applying an electric field. Signal electrodes 12 are formed along the optical waveguide 11, and ground electrodes 13 sandwich the signal electrodes 12. Electrodes 12 and 13 create electric fields across the optical waveguide 11, thereby electro-optically controlling a light beam traveling through it.

As mentioned above, LN crystal is suitable for the optical modulator 10 because of its good electro-optical effect. The optical waveguide 11 can be fabricated easily on an LN crystal substrate by, for example, forming a metallic film pattern on its surface and then applying a thermal diffusion process, or alternatively, by proton exchange in benzoic acid after the patterning process.

The optical waveguide 11 is partly split into two parallel waveguides 11a and 11b in its middle portion, and a signal electrode 12 is placed in the vicinity of each of them. This arrangement is referred to as a dual electrode structure, or a dual drive structure. The term "interaction length" and its symbol "L" will be used to refer to the length of the parallel waveguides 11a and 11b (or the effective length of each signal electrode 12, in other words).

Because of the use of, for example, a z-cut LN crystal substrate, the optical modulator 10 includes a buffer layer 14 between the substrate and the signal and ground electrodes 12 and 13 in order to prevent the light beam propagating through the optical waveguide 11 from being absorbed by those electrodes. This buffer layer 14 is formed by coating, for example, silicon dioxide (SiO$_2$) with a thickness of 0.2 to 1 $\mu$m. As FIG. 2 shows, the optical waveguide 11 and signal electrode 12 are fabricated on a ridge 15; i.e., they are offset with respect to the ground electrodes 13.

In some embodiments, a very thin (for example, 100–200 nm) layer of silicon might be on the buffer layer 14 along the entire buffer layer 14 between the signal electrode 12 and the ground electrodes 12 and 13. This thin layer improves temperature stability of the optical modulator 10. However, the present invention is not limited to the use of this thin layer on the buffer layer 14, and embodiments of the present invention might not include this layer.

The buffer layer 14 might include a dopant to reduce DC drift. For example, the buffer layer 14 might include an indium dopant in concentration of, for example, approximately 10 wt % in SiO$_2$, to reduce DC drift. However, the present invention is not limited to the use of a dopant in the buffer layer.

With the above-described structure, the optical modulator 10 is designed in such a way that, for example, the characteristic impedance Z0 of each signal electrodes 12 be within an intended range that limits the reflection of microwave energy to a predetermined level or below. With appropriate phase matching between the light beam and modulating microwave signal, the optical modulator 10 can, for example, provide the performance of 40 Gigabit per second (Gbps). Here, the gap width S between the signal electrodes 12 and ground electrodes 13 is set, for example, to 44 $\mu$m or wider, the interaction length L of the signal electrodes 12 is set, for example, to 41 mm or longer, and the drive voltage is set, for example, to 2.3 V or lower.

Accordingly, with the gap width S set to 44 $\mu$m or wider, and the interaction length L set to 41 mm or longer, the optical modulator 10 can perform optical modulation at 40 Gbps.

In the following explanation, the symbol "Hg" will be used to refer to the thickness of the ground electrodes 13, as well as "Hr" to refer to the height of the ridge 15.

Before going into the details of how to decide design parameters for the optical modulator 10, we will first explain the principle of operation of this device, as well as what problems lie in its design.

To make the optical modulator 10 operate at high modulation rates, the signal electrodes 12 and ground electrodes 13 are structured, for example, as traveling-wave electrodes with appropriate resistors (not shown) for matched termination. The two signal electrodes 12 are supplied, for example, with complementary driving signals from push-pull microwave signal sources Sa and Sb shown in FIG. 1. Those signals produce a traveling electric field along each of the parallel waveguides 11a and 11b, causing their refractive indexes n to vary by +Δn and −Δn, respectively. This variation in the refractive index results in a phase shift of the light beam traveling through each path of the parallel waveguides 11a and 11b. Accordingly, the output lights from the parallel waveguides 11a and 11b will have a certain phase difference that is determined by the strength of the electronic field being applied to them.

When the resultant phase-shifted light beams are combined again at the output end of the optical waveguide 11, their phase difference causes what is known as optical interference. With no phase differences (zero degrees), the two light beams enhance each other. With a 180-degree ($\pi$) phase difference, on the other hand, they cancel each other. As a result of interference, the intensity of the output beam is not the same as the intensity of the input beam. That is, the light beam has been intensity-modulated with the drive signals during its travel through the optical waveguide 11.

The optical modulator 10 has to provide a sufficient optical response for the purpose of wideband applications. In order to yield a wider modulation bandwidth, the light beam should be matched with the modulating microwave signal in terms of the phase. This phase matching would be achieved by designing the signal electrode 12 in such a way that its effective refractive index for microwaves will agree with that the optical waveguide 11. Typically, however, the effective refractive index for microwave is twice as large as the LN substrate's optical refractive index, which is 2.15. It is therefore necessary to devise some good methods to overcome the problem. One is to form a ridge on the LN substrate by etching the portions immediately beside the optical waveguide 11 as shown in FIG. 2. Another is to increase the thickness of the ground electrodes 13. Such approaches are taken to reduce the effective refractive index for microwave as close to 2.15 as possible.

Aside from the issue of phase matching, the circuit designer should also consider the reduction of operating voltage of the optical modulator since 40 Gbps-class driver amplifiers can only provide low output voltages. The conventional approach to achieve this is to place the signal electrode 12 and ground electrodes 13 as close to each other as possible. That is, the gap width S is made as small as 30 $\mu$m or so, so as to yield a sufficient electric field strength with a lower drive voltage.

The reduction of the gap width S, however, leads to an increased conductor loss for microwave signals, meaning that the high-frequency components of the driving microwave signal cannot propagate over the optical waveguide 11. This problem makes it difficult to increase the modulation speed in optical communications systems. To realize the required modulation bandwidth with a reduced gap width S, the circuit designer then has to shorten the interaction length L in attempt to minimize the high-frequency losses. However, a shorter interaction length L naturally results in a smaller phase displacement, or an insufficient modulation depth. A higher drive voltage is thus needed to yield sufficient phase displacement, quite contrary to his/her original intention for the drive voltage reduction. In this way, the conventional design approach only ends up with contradictory requirements, or a deadlock.

Figure 3:
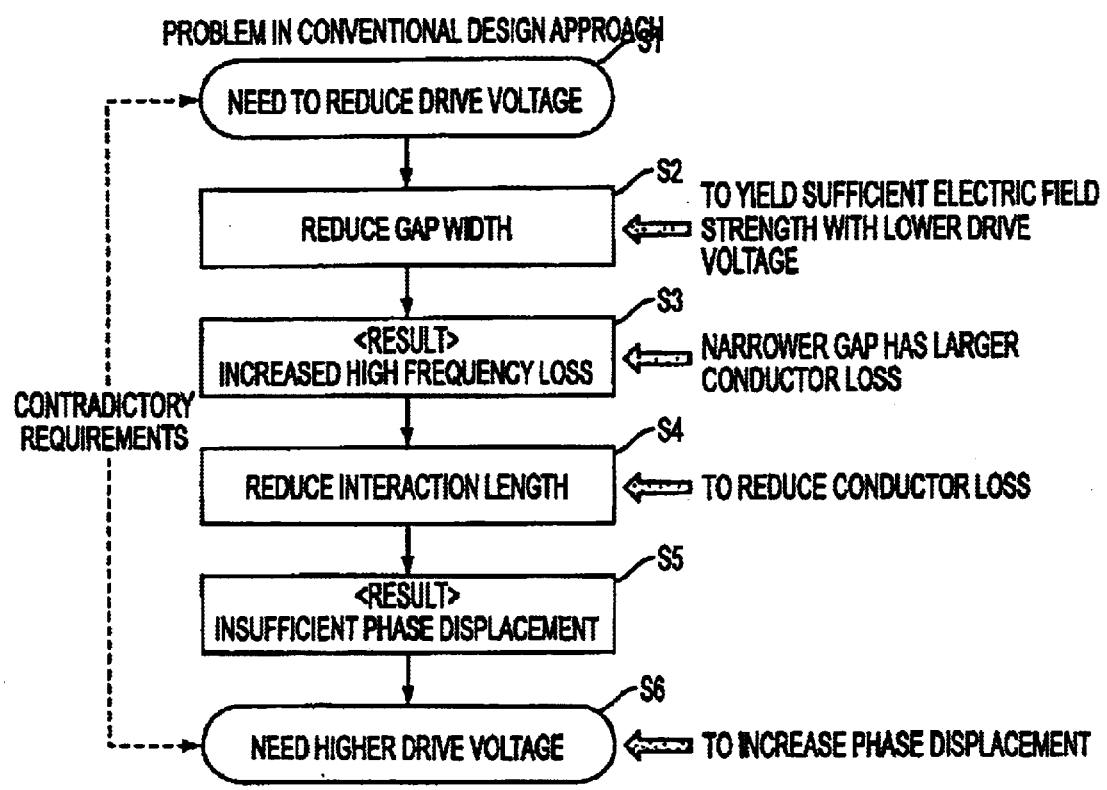
FIG. 3 shows a problem that limits the performance of conventional optical modulators.

FIG. 3 shows the problem that limits the performance improvements for conventional optical modulators.

(S1) The conventional modulator design starts with an attempt to reduce the drive voltage.

(S2) To produce a sufficient electric field for the optical waveguide 11, the gap width S should be reduced in compensation for a reduced drive voltage.

(S3) The reduction of the gap width S results in an increased loss of high-frequency components of the microwave signal because the conductor loss becomes dominant as a performance-limiting factor.

(S4) The interaction length L should then be shortened in attempt to minimize the effect of the conductor loss.

(S5) The shortened interaction length L results in a smaller phase displacement.

(S6) To yield a sufficient phase displacement, it is necessary to raise the drive voltage. This conclusion contradicts with the initial action that was attempted at step S1.

As seen from the above discussion, the conventional approach has been unable to provide optimal solutions in designing optical modulators (particularly the high-speed devices for operation at 40 Gbps and up). The present invention provides a high-performance optical modulator 10 which reduces both drive voltage and high-frequency component loss of microwave modulation signals. This is accomplished by finding a set of optimal design parameters for an optical modulator, including a wider gap S and a longer interaction length L, compared to those of conventional devices.

Referring now to FIGS. 4 to 22, the next section will describe a specific design method for the optical modulator 10, according to embodiments of the present invention, assuming that, for example, the driver amplifier can output 2 V at most. The target performance is over 40 Gbps (e.g., 40 to 43.5 Gbps) with the drive voltage of 2 V.

Figure 4:
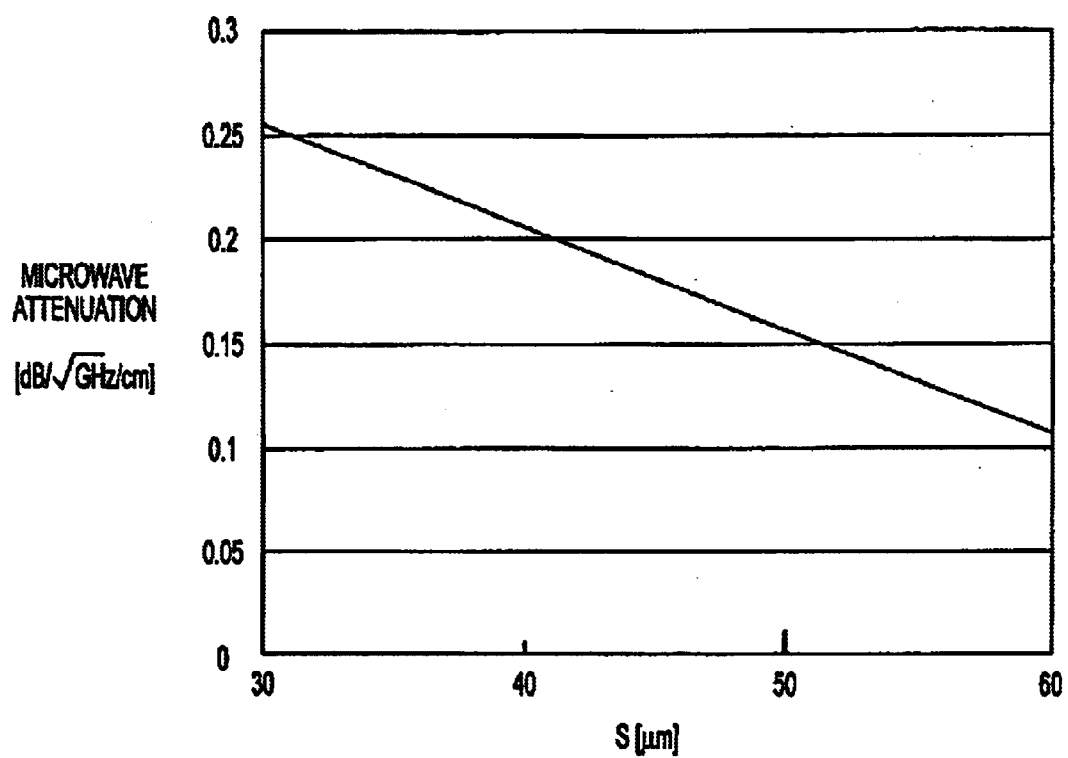
FIG. 4 shows the relationship between the gap width and the microwave attenuation per unit length of the signal electrode.
Figure 5:
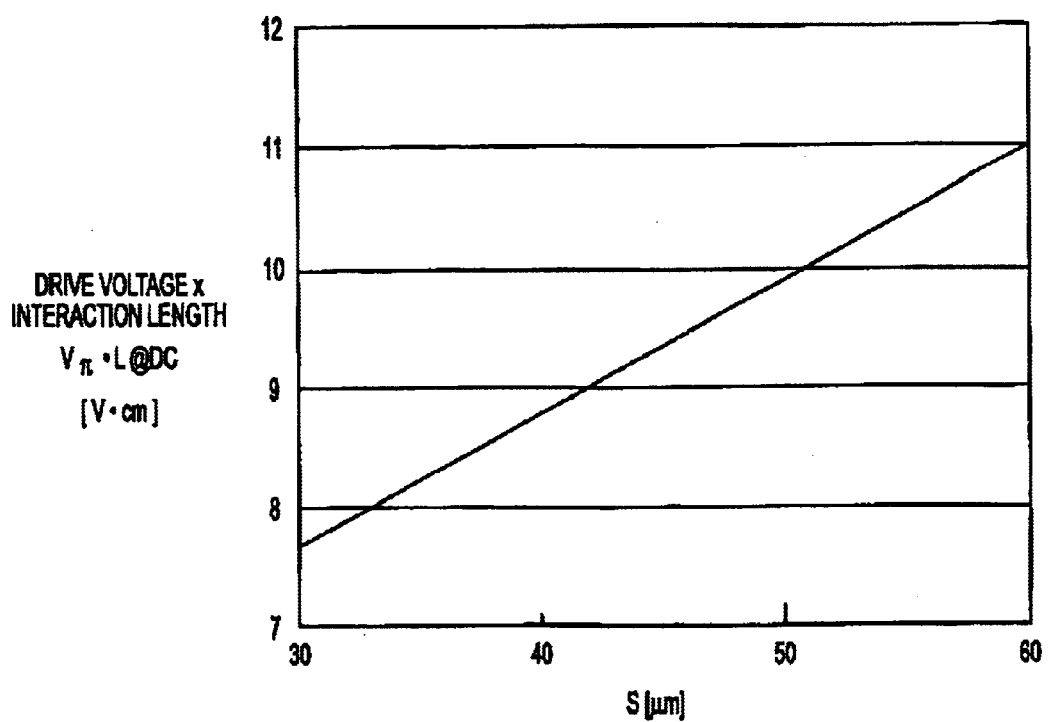
FIG. 5 shows the relationship between the gap width and the product of drive voltage and interaction length.

FIG. 4 shows the relationship between the gap width S and the microwave attenuation per unit length of the signal electrode 12. The vertical axis represents the microwave attenuation in units of $dB/(GHz)^{1/2}/cm$, while the horizontal axis shows the gap width S in units of $\mu$m. FIG. 5 depicts the relationship between the gap width S and the product of drive voltage and interaction length L. The vertical axis represents the product $V\pi \times L$ in units of V·cm, while the horizontal axis represents the gap width S in units of $\mu$m. $V\pi$ stands for "half-wavelength voltage," which refers to the amount of voltage that is required to cause a phase shift of $\pi$ (180 degrees) to the light beam propagating through the optical waveguide 11.

FIG. 4 indicates that the microwave attenuation decreases as the gap width S increases, while FIG. 5 shows that the drive voltage increases with the gap width S. That is, these two graphs suggest an unfortunate relationship that an attempt to reduce microwave attenuation would result in an increased drive voltage due to a widened gap width S.

Figure 6:
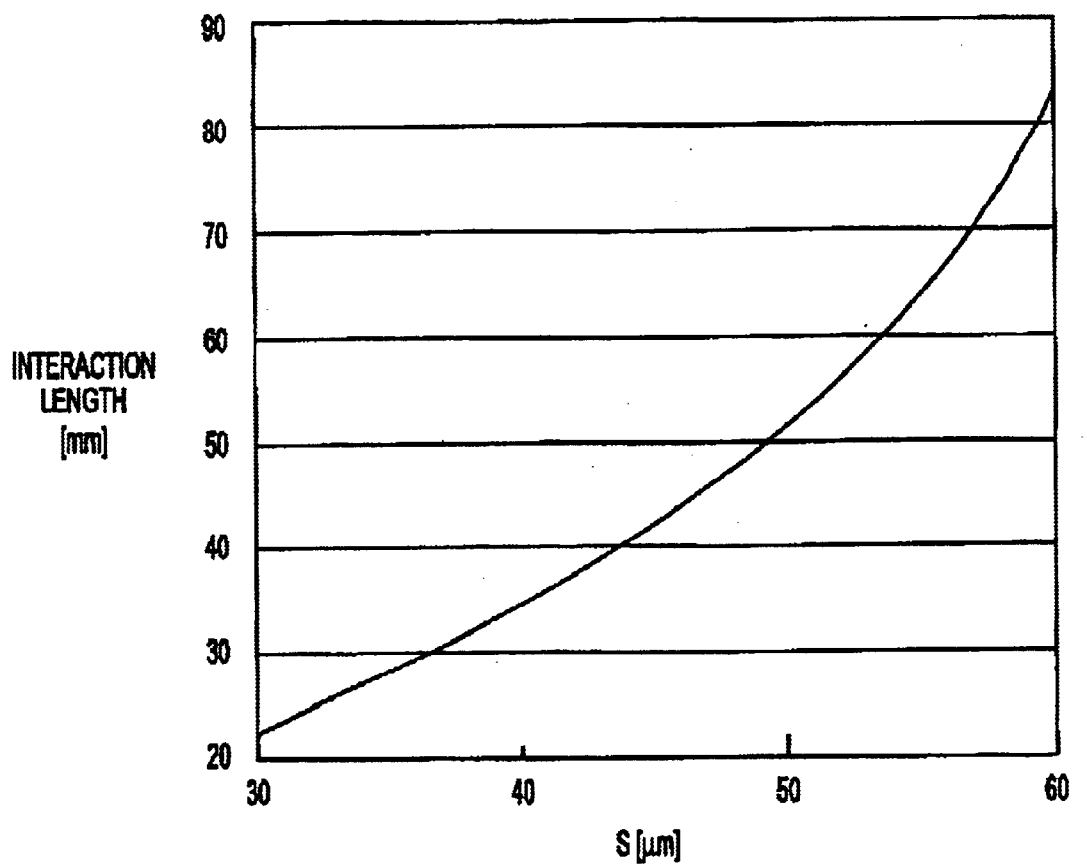
FIG. 6 shows the relationship between the gap width and interaction length in the case where the microwave attenuation is fixed (i.e., the modulation bandwidth is constant)

Another aspect of the relationship between the gap width S and interaction length L is shown in FIG. 6, under the assumption that the microwave attenuation is fixed. More specifically, FIG. 6 assumes a −6 dB bandwidth of 30 GHz. The vertical axis represents the interaction length L in units of mm, while the horizontal axis represents the gap width S in units of $\mu$m.

FIGS. 4 and 6 show us the way to reduce the microwave attenuation to a certain level. That is, FIG. 4 is used to find a particular gap width S for the desired attenuation, and then FIG. 6 gives the interaction length L corresponding to that gap width S. The curves of FIGS. 4 and 6 suggest that a wider gap is necessary for a smaller attenuation, and it leads to a longer interaction length. Consider, for example, that the circuit designer wishes to reduce the microwave attenuation from 0.2 to 0.1. FIG. 4 tells him/her that the gap width S should be widened from 40 to 60. With FIG. 6, he/she then interprets this change to an expansion of the interaction length L, from 33 to 82. After all, the circuit designer has learned that, in order to reduce the microwave attenuation by one-half, the gap width S has to be increased by 50 percent, and the interaction length L should be twice as long as the current length.

Figure 7:
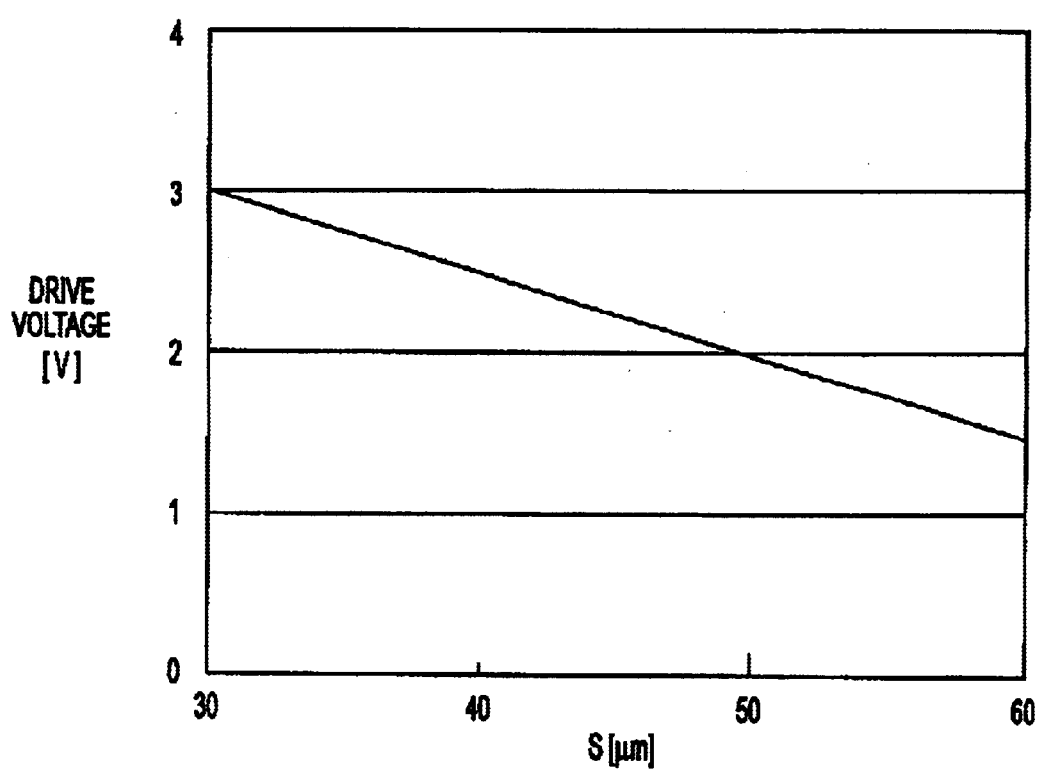
FIG. 7 shows the relationship between the gap width and drive voltage, with the interaction length given in FIG. 6.

FIG. 7 shows the drive voltage versus the gap width S, based on the interaction length L given in FIG. 6. The vertical axis represents the drive voltage in units of V, while the horizontal axis represents the gap width S in units of $\mu$m. According to FIG. 7, the signal electrode 12 with an increased interaction length L can operate with a lower drive voltage as the gap width S is increased.

Figure 8:
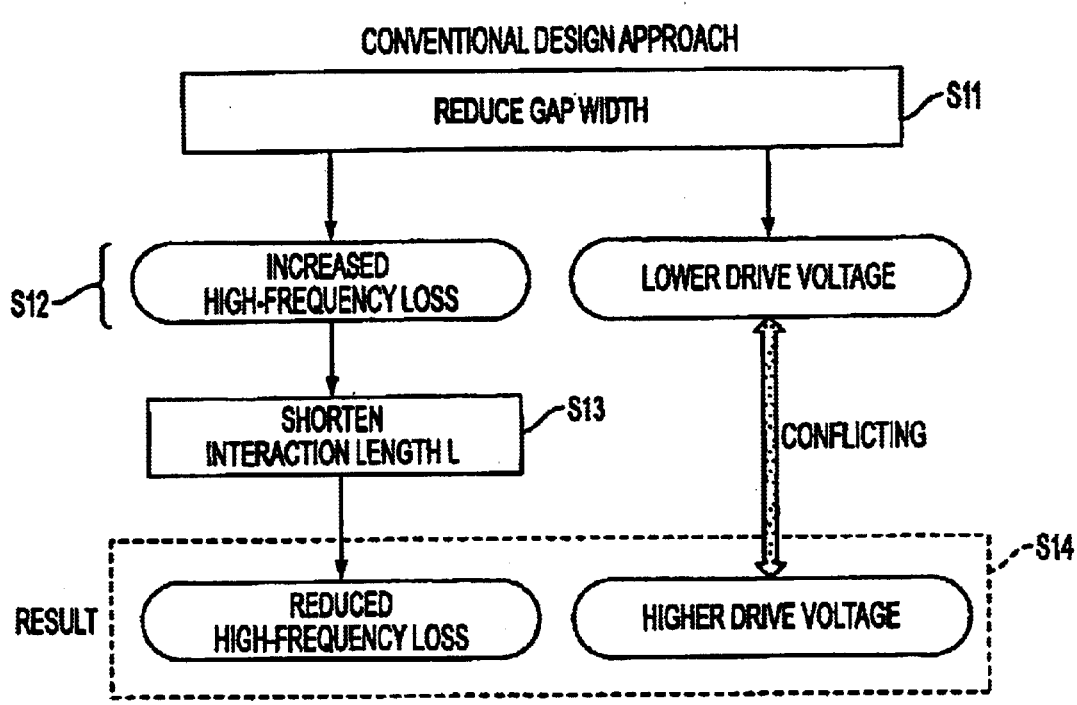
FIG. 8 shows the relationship between the gap width and interaction length in a conventional modulator.
Figure 9:
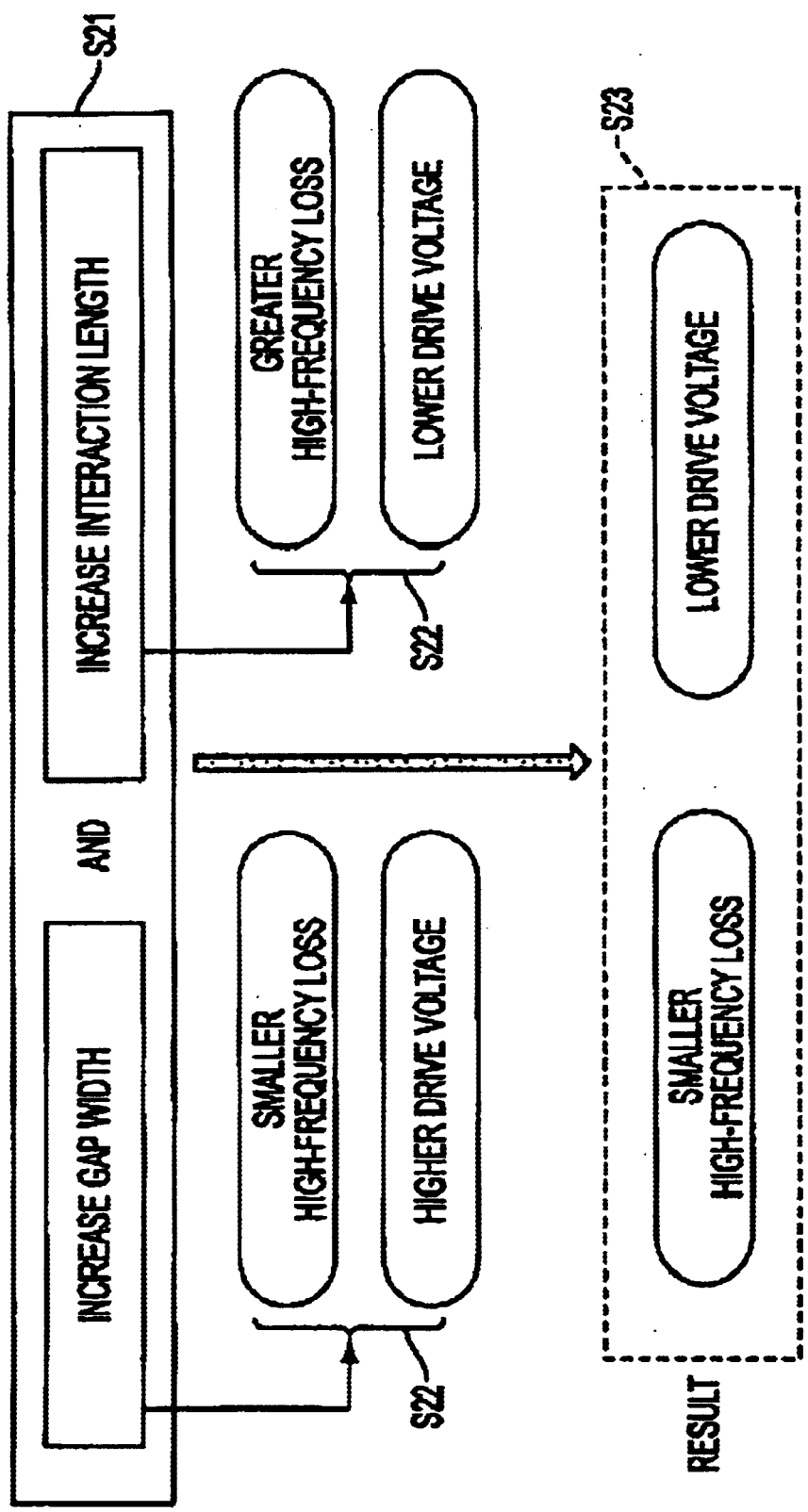
FIG. 9 shows the relationship between the gap width and interaction length in an optical modulator, according to an embodiment of the present invention.

Referring now to FIGS. 8 and 9, the design method according to embodiments of the present invention will be compared with the conventional method in terms of the relationship between the gap width S and interaction length L. FIG. 8 shows the case of a conventional modulator.

(S11) The gap width S is reduced.

(S12) While permitting the drive voltage to be decreased, the reduced gap width S increases the loss at high frequencies.

(S13) To reduce the high-frequency loss, the interaction length L is shortened.

(S14) While alleviating the high-frequency loss, the shortened interaction length L reduces the optical phase displacement, thus necessitating an increased drive voltage for compensation.

FIG. 9 shows how the present invention solves the above problem by using a wider gap and longer interaction length.

(S21) Both the gap width S and interaction length L are increased according to FIG. 6, which gives their relationships with the assumption of a particular level of microwave attenuation.

(S22) While it could reduce the high-frequency loss, increasing the gap width S alone would necessitate a higher drive voltage. On the other hand, increasing the interaction length L alone could decrease the drive voltage, although it would increase the high-frequency loss.

(S23) By increasing both the gap width S and interaction length L at step S21, it is possible to reduce both the high-frequency loss (see FIGS. 4 and 6) and drive voltage (see FIG. 7).

As seen from the above section, the present invention provides a solution for reducing the drive voltage of an optical modulator. It should be noted here that, unlike the conventional approach, the design method according to embodiments of the present invention starts not with reducing the gap width S, but with increasing both the gap width S and interaction length L. With this new approach, the method according to embodiments of the present invention successfully achieves the reduction of drive voltage while suppressing the loss of high-frequency components of microwave signals.

For proper design of an optical modulator 10, there are some preconditions that have to be met in determining the gap width S, interaction length L, and other parameters. One of such preconditions relates to the characteristic impedance Z0 of the signal electrode 12, which has to be set within a certain range in consideration of microwave reflection. Another precondition relates to phase matching between a light beam and microwave signal. The following section will first discuss the former issue, the characteristic impedance Z0 of the signal electrode 12.

The signal electrode 12 is a medium for a microwave signal, where a traveling wave and its reflection form a standing wave. This means that a part of the electric energy traveling forward could be reflected back to the circuit that feeds a modulation signal to the optical modulator 10. Since the reflected energy may cause an adverse effect on the circuit, the circuit designer has to avoid this problem by setting the level of microwave reflection to −20 dB or below.

Figure 10:
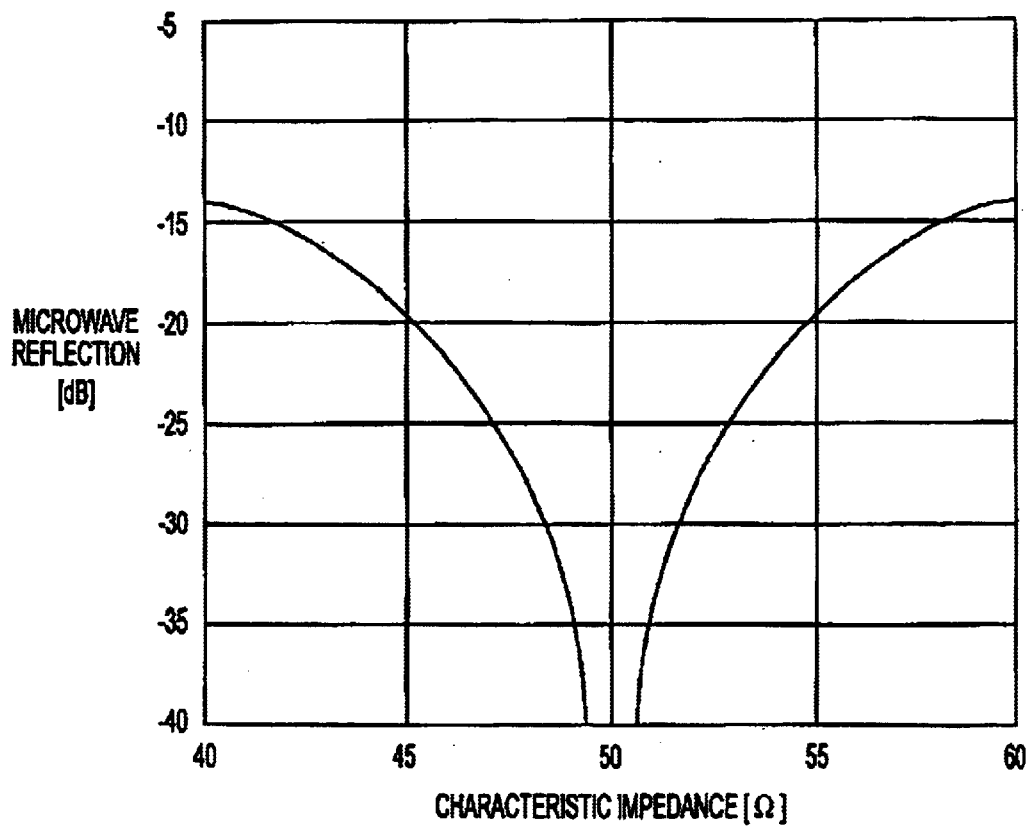
FIG. 10 shows the relationship between the characteristic impedance and microwave reflection, according to an embodiment of the present invention.

FIG. 10 shows the relationship between the characteristic impedance Z0 and microwave reflection. The vertical axis represents the microwave reflection in units of dB, while the horizontal axis shows the characteristic impedance Z0 of the signal electrode 12 in units of Ω (ohm). FIG. 10 suggests that the characteristic impedance Z0 should be set within a range of about 45 to 55 Ω in order for the reflection to be kept below −20 dB.

Figure 11:
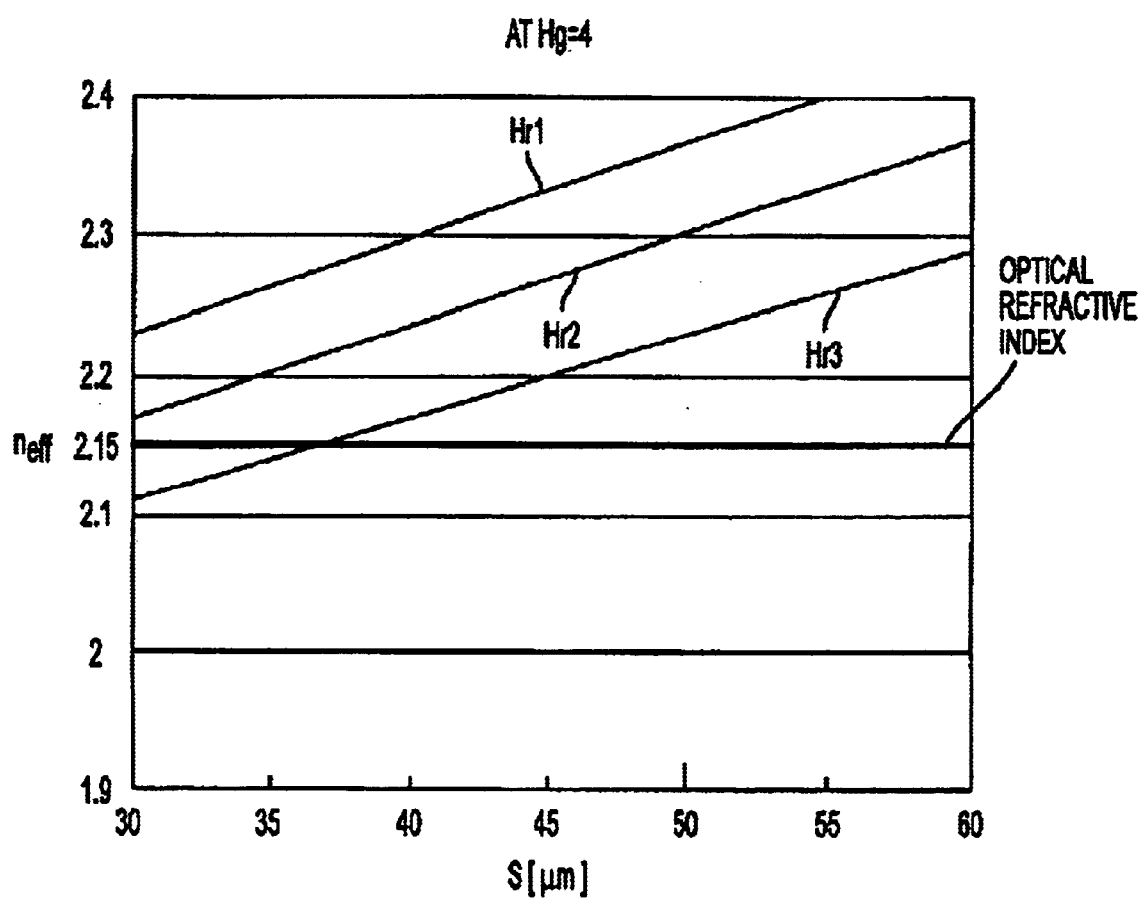
FIGS. 11 to 13 show the relationship between the gap width and effective refractive index of microwaves for three different thicknesses of the ground electrodes, according to an embodiment of the present invention.
Figure 12:
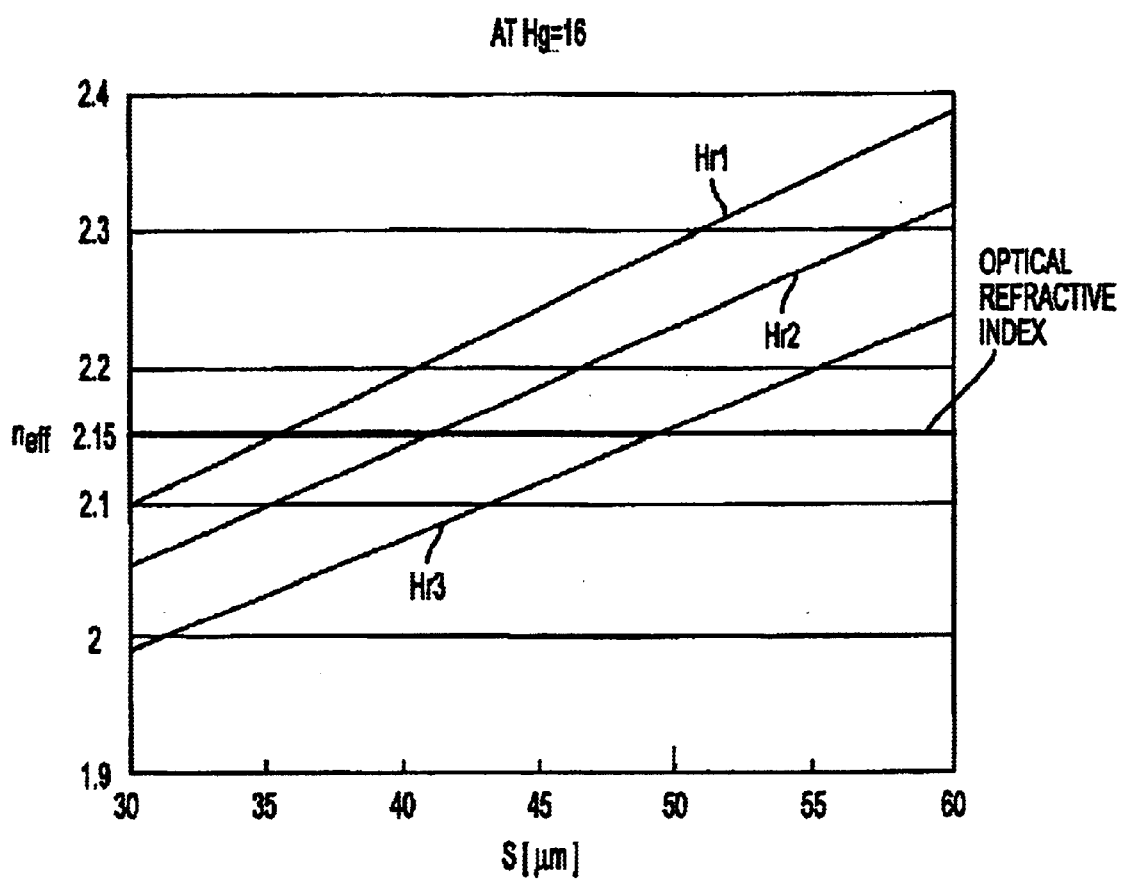
Figure 13:
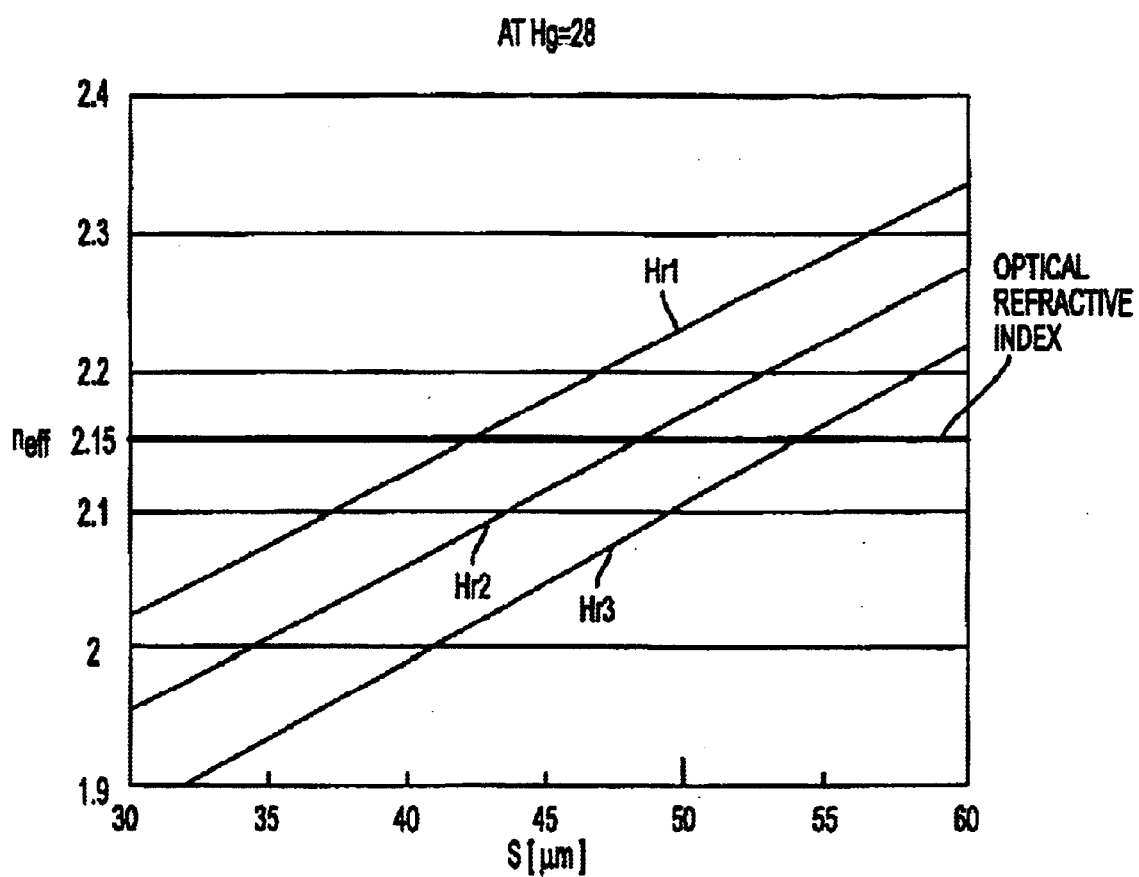

Referring now to FIGS. 11 to 13, the issue of phase matching will be discussed below. The light beam and microwave modulation signal must be phase-matched to yield a wider modulation bandwidth. As mentioned earlier, the effective optical refraction index $n_{eff}$ of LN media is 2.15. The optical modulator 10 should be tuned in such a way that the same effective refraction index will be obtained for microwaves traveling over the signal electrode 12. More specifically, the range of ridge height Hr, ground electrode thickness Hg, and gap width S are narrowed down to achieve the phase matching, while keeping the characteristic impedance Z0 within the range of 45 to 55 Ω.

FIGS. 11 to 13 show the relationship between the gap width S and effective refraction index $n_{eff}$ of microwaves, which was obtained through a computational analysis with finite element techniques. The vertical axis represents the effective refractive index $n_{eff}$, while the horizontal axis represents the gap width S in units of μm. FIGS. 11 to 13 assume different ground electrode thicknesses, Hg=4, Hg=16, and Hg=28 μm., respectively. Each graph contains three curves for different ridge heights Hr, including Hr1=6, Hr2=8, and Hr3=10 μm.

Figure 14:
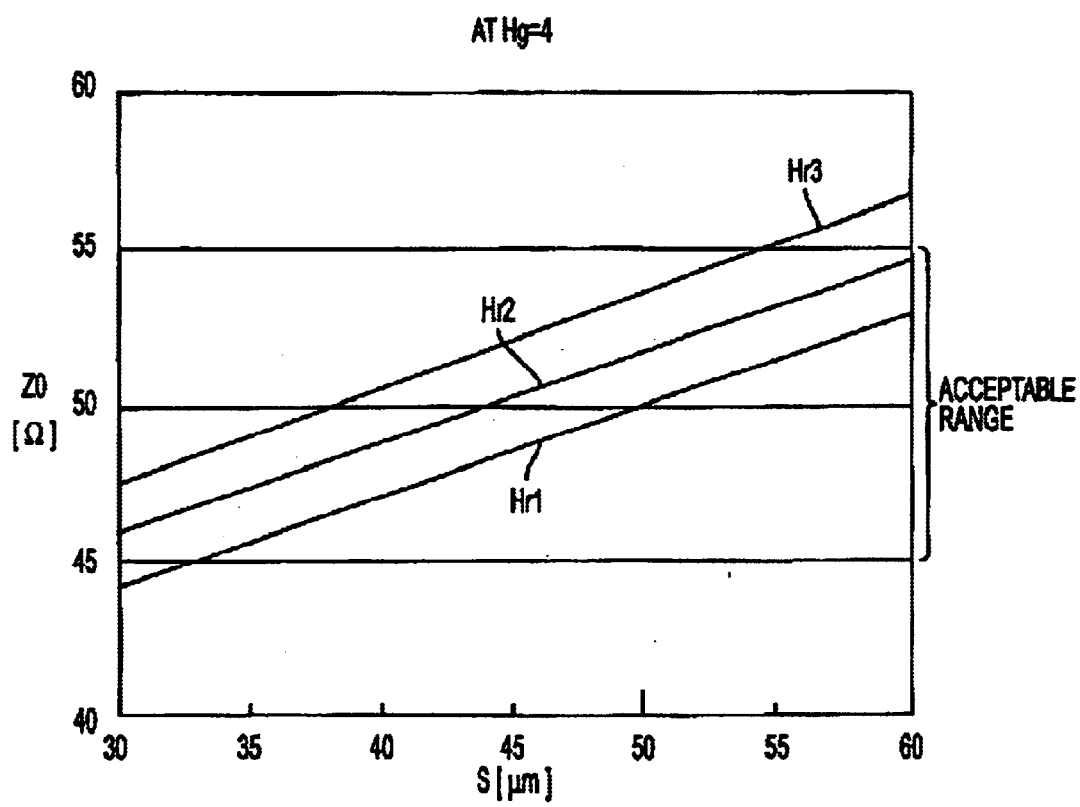
FIGS. 14 to 16 show the relationship between the gap width and characteristic impedance for three different thicknesses of the ground electrodes, according to an embodiment of the present invention.
Figure 15:
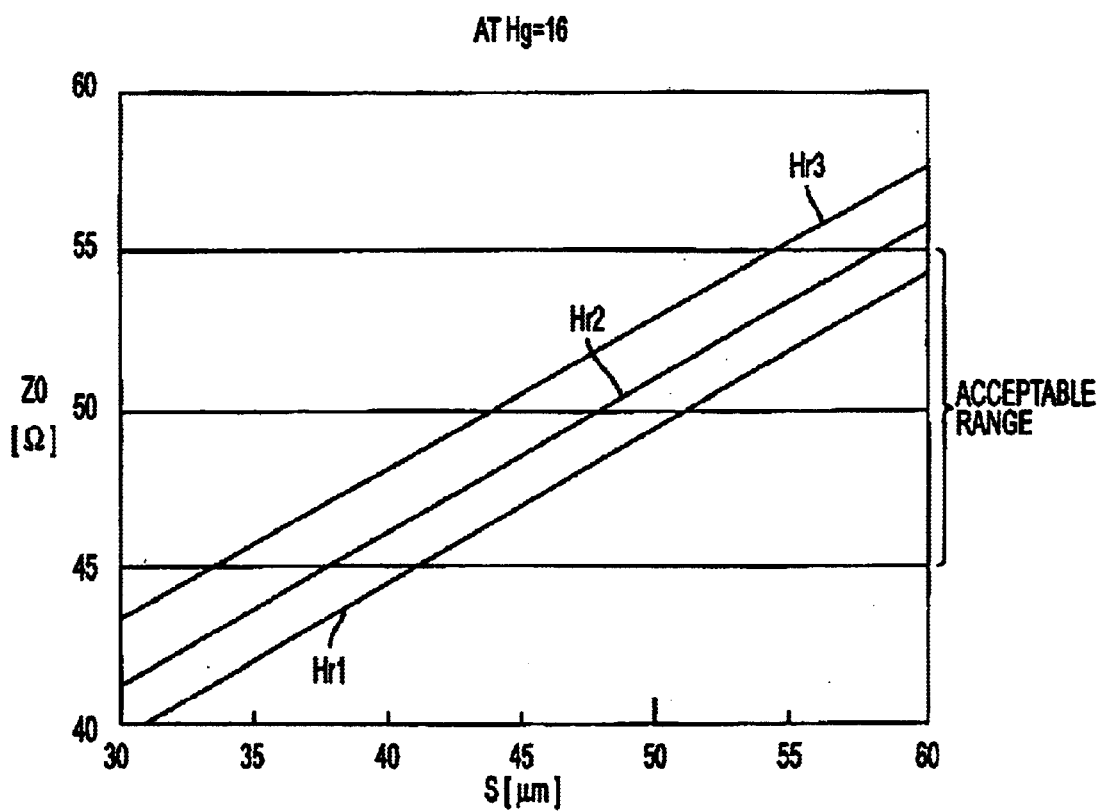
Figure 16:
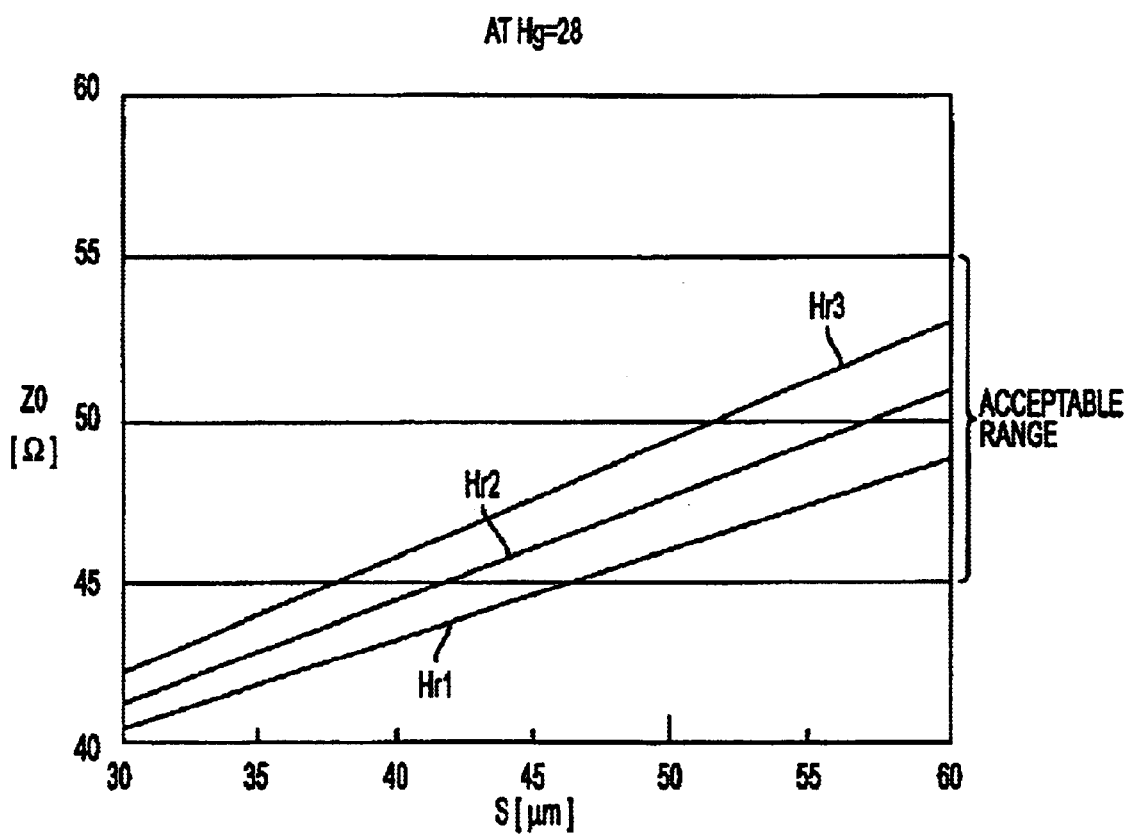

FIGS. 14 to 16 show the relationship between the gap width S and characteristic impedance Z0, which was obtained through a computational analysis with finite element techniques. The vertical axis represents the characteristic impedance Z0 in units of Ω, while the horizontal axis represents the gap width S in units of μm. FIGS. 14 to 16 assume different ground electrode thicknesses, Hg=4, Hg=16, and Hg=28 μm, respectively. Each graph contains three curves to represent different ridge heights Hr, including Hr1=6, Hr2=8, and Hr3=10 μm.

Figure 17:
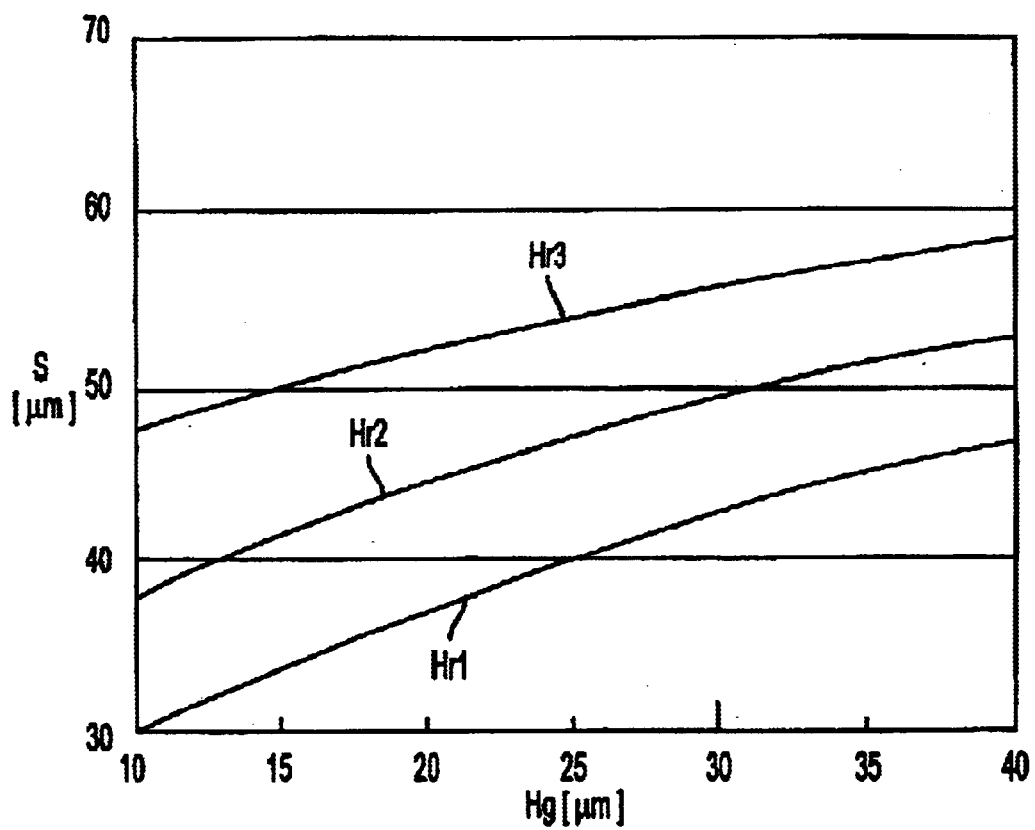
FIGS. 17 to 19 show the relationship between the gap width and ground electrode thickness, according to an embodiment of the present invention.

FIG. 17 gives the relationship between the ground electrode thickness Hg and gap width S. The vertical axis shows the gap width S in units of μm, while the horizontal axis represents the ground electrode thickness Hg in units of μm. The graph shows three curves to represent different ridge heights Hr, including Hr1=6, Hr2=8, and Hr3=10 μm.

FIG. 17 is produced by combining the data of FIGS. 11 to 13, which is referred to herein as the first relationship. Suppose, for example, that the circuit designer has chosen a ridge height Hr of 8 μm (=Hr2) and a ground electrode thickness Hg of 33 μm. The Hr2 curve in FIG. 17 indicates that the effective refraction index $n_{eff}$=2.15 for microwaves will be obtained by setting the gap width S to 50 μm. This combination of circuit parameters satisfies the precondition of phase matching.

Figure 18:
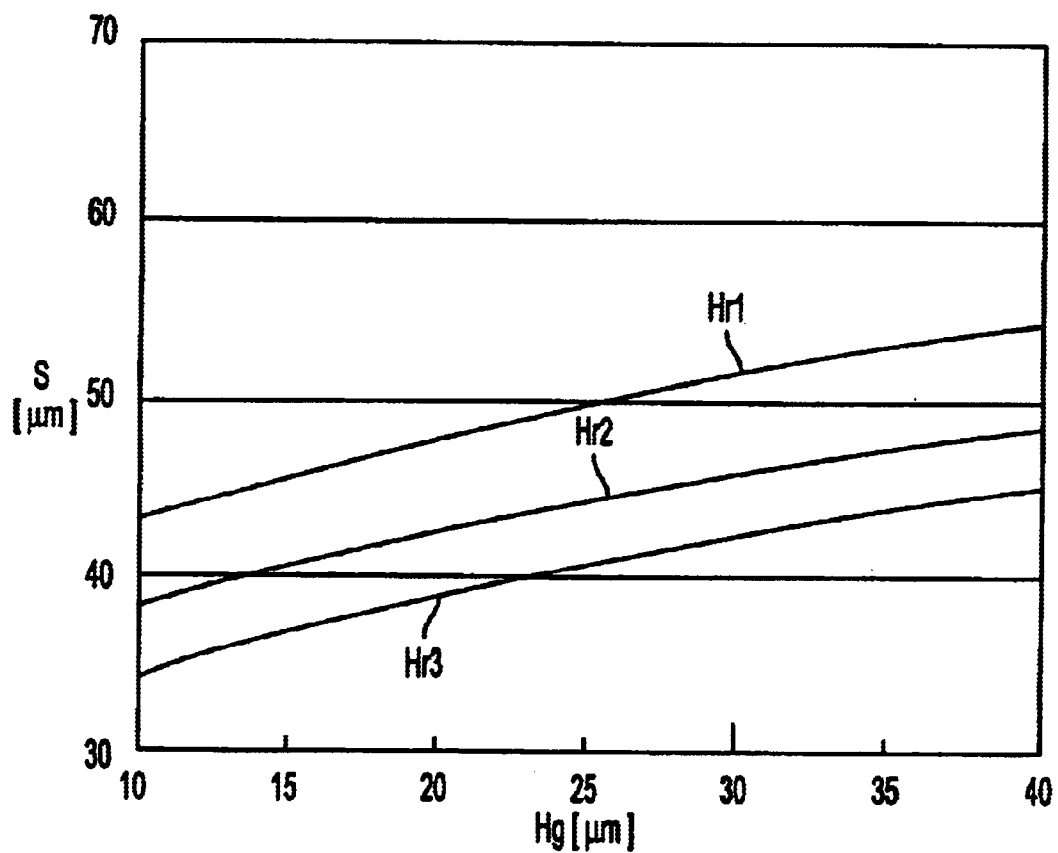

FIG. 18 is another graph that gives the relationship between the ground electrode thickness Hg and gap width S. The vertical axis shows the gap width S in units of μm, while the horizontal axis represents the ground electrode thickness Hg in units of μm. The graph shows three curves to represent different ridge heights Hr, including Hr1=6, Hr2=8, and Hr3=10 μm. FIG. 18 has been produced by combining the data of FIGS. 14 to 16, assuming the lower limit of characteristic impedance, Z0=45 Ω. This relationship is referred to herein as the second relationship.

Figure 19:
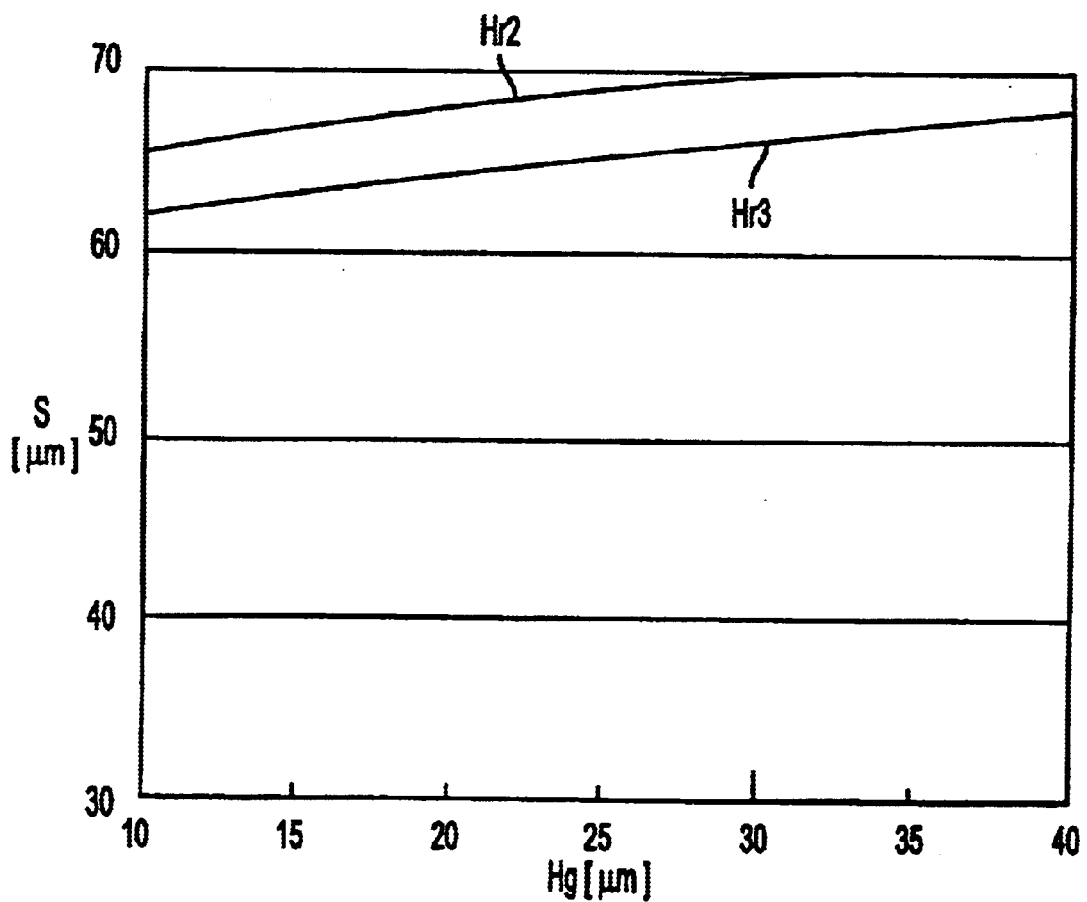

FIG. 19 is yet another graph representing the relationship between the ground electrode thickness Hg and gap width S. The vertical axis shows the gap width S in units of μm, while the horizontal axis shows the ground electrode thickness Hg in units of μm. This graph contains three curves to represent different ridge heights Hr, including Hr2=8 and Hr3=10 μm. FIG. 19 has been produced by combining the data of FIGS.

14 to 16, assuming the upper limit of characteristic impedance, Z0=55 Ω. This relationship is another part of the second relationship.

Suppose, for example, that the circuit designer has chosen a ridge height Hr of 10 μm (i.e., Hr3) and a ground electrode thickness Hg of 25 μm. The Hr3 curves in FIGS. 18 and 19 indicate that the characteristic impedance Z0 of the signal electrode 12 will fall safely within the acceptable range of 45 to 55 Ω if the gap width S is set between 42 and 65 μm. This setup of circuit parameters enables phase matching to be achieved.

Figure 20:
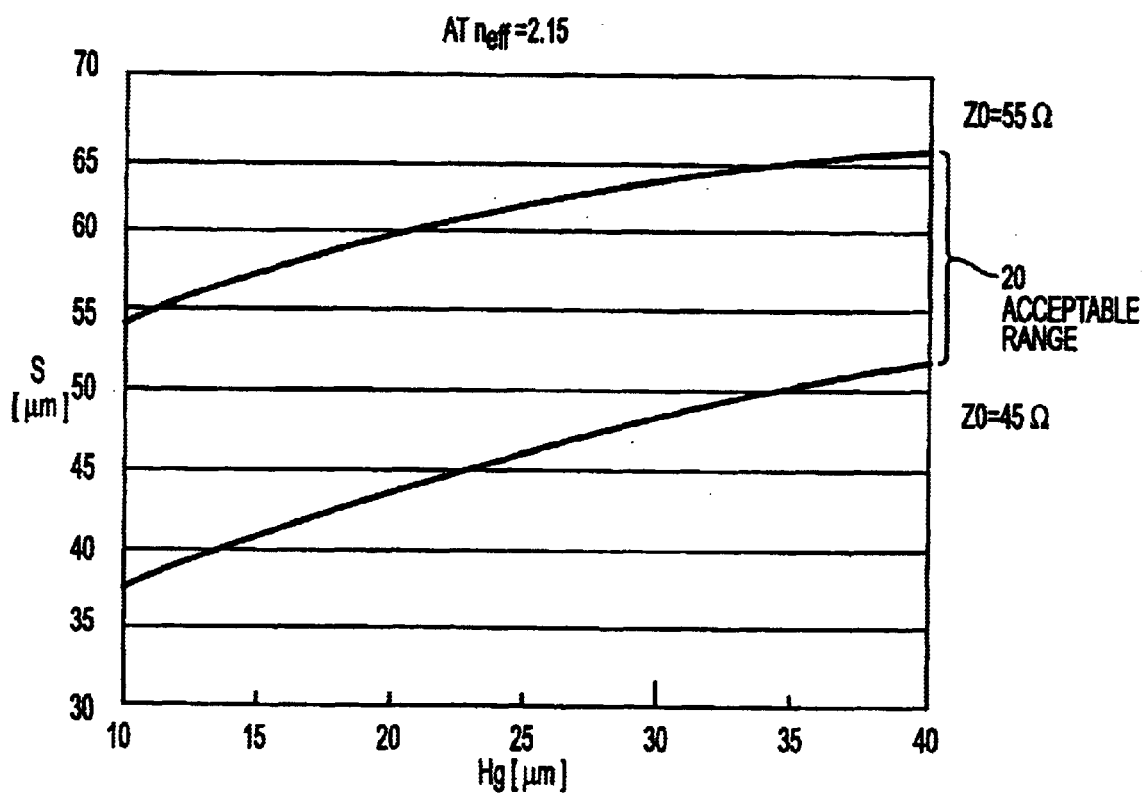
FIG. 20 shows the relationship between the gap width and ground electrode thickness which satisfies the requirement that the characteristic impedance Z0 be within a range of 45 to 55 ohms, and the effective refractive index $n_{eff}$ be 2.15, according to an embodiment of the present invention.

FIG. 20 shows the relationship between the gap width S and ground electrode thickness Hg which satisfies the requirement that the characteristic impedance Z0 be within the range of 45 to 55 ohms for the effective refractive index $n_{eff}$ of 2.15. The vertical axis represents the gap width S in units of μm, while the horizontal axis represents the ground electrode thickness Hg in units of μm. The lower curve in this graph has been produced from FIGS. 17 and 18, which represents the lower limit condition where the characteristic impedance Z0 is 45 Ω. Likewise, the upper curve has been produced from FIGS. 17 and 19, which represents the upper limit condition where the characteristic impedance Z0 is 55 Ω. The intermediate area between those two curves is referred to as an acceptable range 20, which satisfies the aforementioned preconditions of phase matching (i.e., effective refraction index $n_{eff}$=2.15) and characteristic impedance (i.e., Z0=45 to 55 Ω). That is, the circuit designer's task is to optimize the parameters (including gap width S, interaction length L, drive voltage, ground electrode thickness Hg) by choosing an appropriate point within the acceptable range 20.

Figure 21:
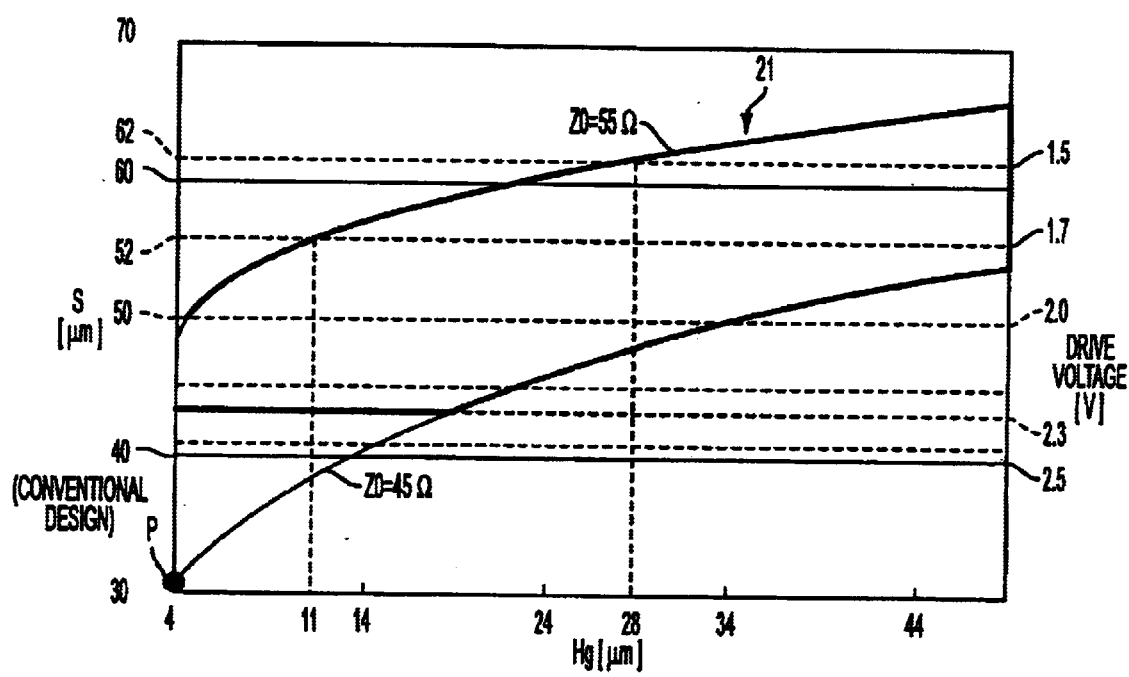
FIG. 21 shows the relationship among the gap width, ground electrode thickness, and drive voltage, according to an embodiment of the present invention.
Figure 22:
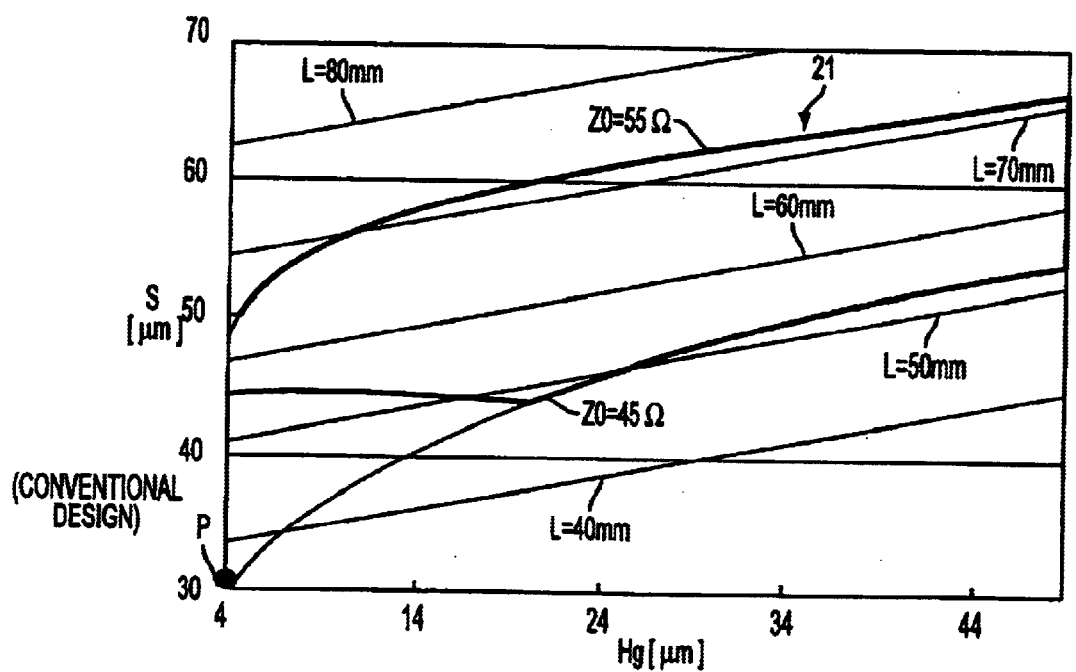
FIG. 22 shows the relationship among the gap width, ground electrode thickness, and interaction length according to an embodiment of the present invention.

FIG. 21 shows the relationship among the gap width S, ground electrode thickness Hg, and drive voltage according to the present invention. The vertical axis represents the gap width S in units of μm and drive voltage in units of V, while the horizontal axis represents the ground electrode thickness Hg in units of μm. FIG. 22 is similar to FIG. 21, but it includes several curves representing various interaction lengths L, instead of drive voltages. The vertical axis represents the gap width S in units of μm, while the horizontal axis represents the ground electrode thickness Hg in units of μm.

Now think of a 40 Gbps-class optical modulator 10 that operates with a drive voltage of 2.3 V and has a gap width S of at least 44 μm. The other circuit parameters can be determined from the graphs of FIGS. 21 and 22 by defining a closed range 21 that satisfies the given conditions. More specifically, the range 21 should lie above the line of S=44 μm (or equivalently, above the line of drive voltage=2.3 V) as indicated by bold lines in FIGS. 21 and 22.

In the present case study, FIGS. 21 and 22 suggest many possible combinations of circuit parameters for a 40 Gbps-class optical modulator 10. One example is:

$$\begin{cases} \text{Drive voltage: S:} & \leq 1.7 \text{ V} \\ \text{Gap width S:} & \geq 56 \text{ μm} \\ \text{Ground electrode thickness Hg:} & \geq 11 \text{ μm} \end{cases}$$

Another example is:

$$\begin{cases} \text{Drive voltage:} & \leq 1.5 \text{ V} \\ \text{Gap width S:} & \geq 62 \text{ μm} \\ \text{Ground electrode thickness Hg:} & \geq 28 \text{ μm} \end{cases}$$

The maximum thickness Hg of the ground electrode 13 is limited practically due to a manufacturing process. The limit may be 50 μm, for example.

Symbol "P" on the graphs of FIGS. 21 and 22 indicates a typical design of a conventional optical modulator for the purpose of comparison. Compared to this conventional design, the optical modulator 10 according to embodiments of the present invention is distinct in its lower drive voltage, wider gap width S, longer interaction length L, and greater ground electrode thickness Hg.

Figure 23:
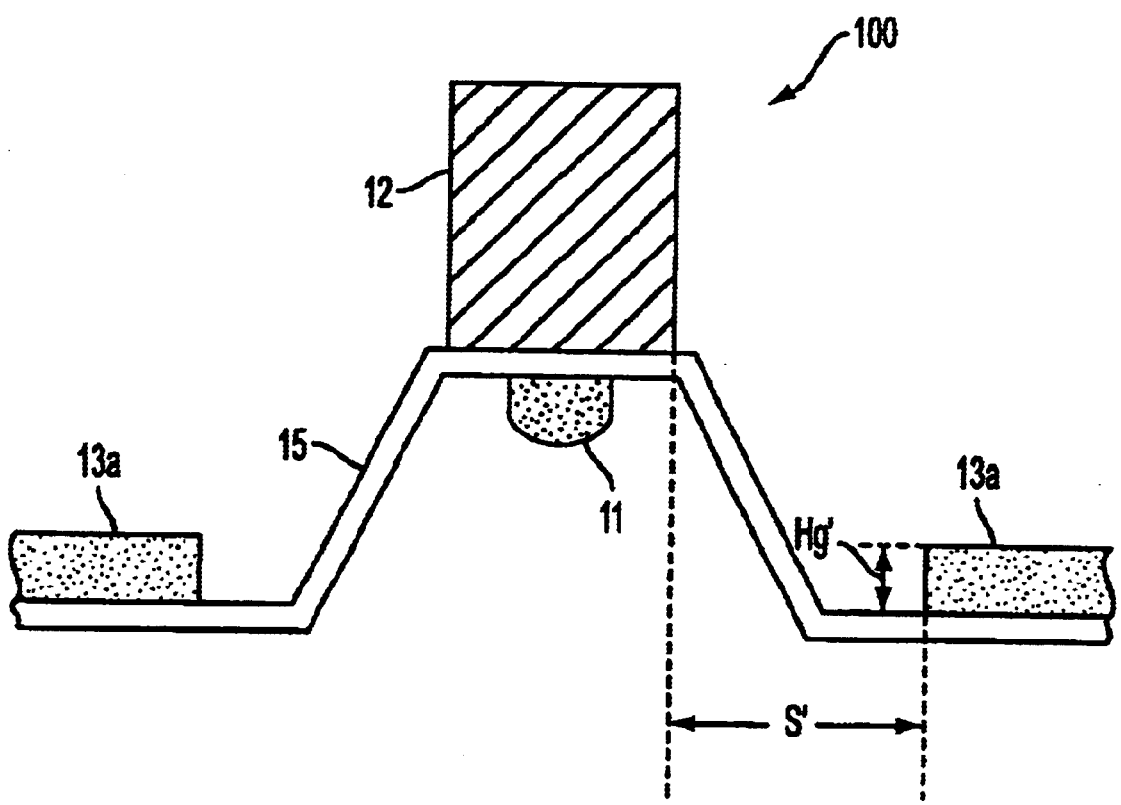
FIG. 23 shows a cross-sectional structure of a conventional modulator.

As stated above, the optical modulator according to embodiments of the present invention is different from conventional optical modulators in, for example, its cross-sectional dimensions. See FIG. 23 for a cross-sectional structure 100 of a conventional modulator and compare it to FIG. 2. While each component shown in FIG. 23 works in the same way as described earlier, the conventional structure 100 is distinct in its narrow gap (S') and thin ground electrodes 13a (Hg'). According to embodiments of the present invention, the cross-sectional structure of FIG. 2 is different from the conventional structure in that it has a wide gap (S) and thick ground electrodes 13 (Hg). Their differences are thus expressed as: S'<S, and Hg'<Hg.

Figure 24:
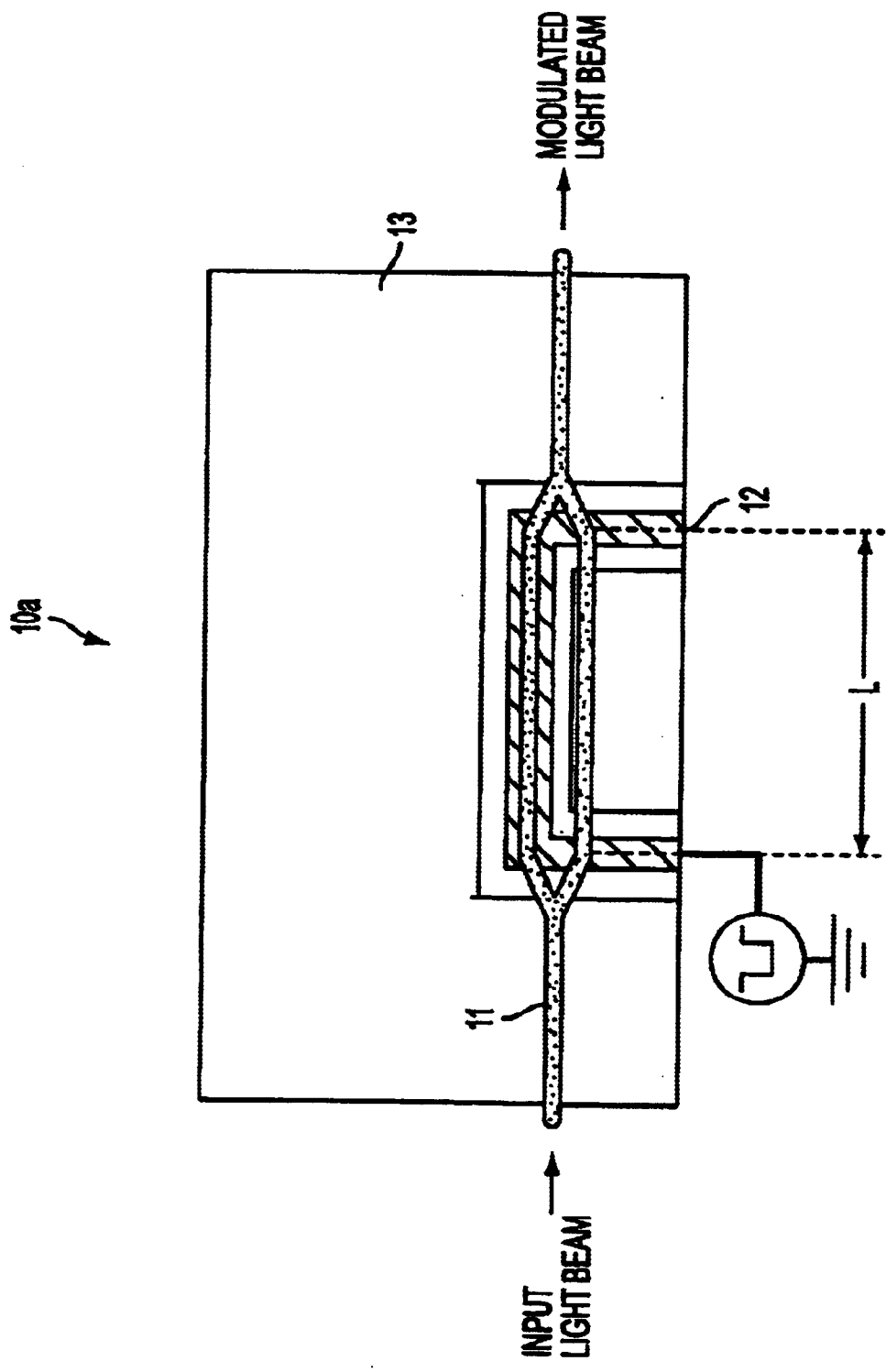
FIG. 24 is a plan view of an optical modulator with single electrode structure according to an embodiment of the present invention.

While it has been explained as a dual-drive optical modulator, the present invention can also be implemented in single-drive structure. FIG. 24 is a plan view of an optical modulator 10a with single electrode, or single-drive, structure. Cross-sectional view is omitted here, since it is similar to the one shown in FIG. 2. Referring to FIG. 24, an optical waveguide 11 is fabricated on an LN crystal substrate. The optical waveguide 11 is partly split into two paths, and a single signal electrode 12 is formed in the vicinity of one of them. This signal electrode 12 is sandwiched by ground electrodes 13. See earlier sections about how they will function.

The above discussions will now be summarized as follows. According to embodiments of the present invention, the gap width S is increased together with the interaction length L to reduce the drive voltage and loss of high-frequency components of the microwave signal. This design approach realizes high-performance optical modulators.

According to embodiments of the present invention, the characteristic impedance of the signal electrode is determined within a range where microwave reflection is limited below a predetermined level. The light beam traveling along the optical waveguide is phase-matched with a microwave modulation signal traveling along the signal electrode. The gap between the signal and ground electrodes is at least 44 μm, and the interaction length of the signal electrode is at least 41 mm. With such a setup, the modulator can operate at 40 Gbps or higher. In this way, the present invention can reduce the drive voltage without sacrificing the modulation bandwidth, thus realizing a high-performance optical modulator.

According to above embodiments of the present invention, an optical modulator includes (a) an optical waveguide fabricated on a crystal substrate that exhibits an electro-optic effect; (b) a signal electrode placed in the vicinity of said optical waveguide; and (c) ground electrodes formed on both sides of said signal electrode. Characteristic impedance of the signal electrode is set within a range where microwave reflection is limited below a predetermined level. A light beam traveling along the optical waveguide is phase-matched with a microwave signal traveling along the signal electrode. A gap width between the signal electrode and ground electrodes is at least 44 μm. Interaction length of the signal electrode is at least 41 mm. The light beam is modulated, for example, at a rate of 40 Gbps or higher.

In embodiments of the present invention, the signal electrode is supplied with a drive voltage of at most 1.7 V, the gap width is at least 56 μm, and the thickness of the ground electrodes is at least 11 μm.

Further, in embodiments of the present invention, the signal electrode is supplied with a drive voltage of at most 1.5 V, the gap width is at least 62 μm, and the thickness of the ground electrodes is at least 28 μm.

Moreover, in embodiments of the present invention, the thickness of the ground electrodes is at most 50 μm.

In additional embodiments of the present invention, the signal electrode can have either a single-drive structure or dual-drive structure.

Figure 25:
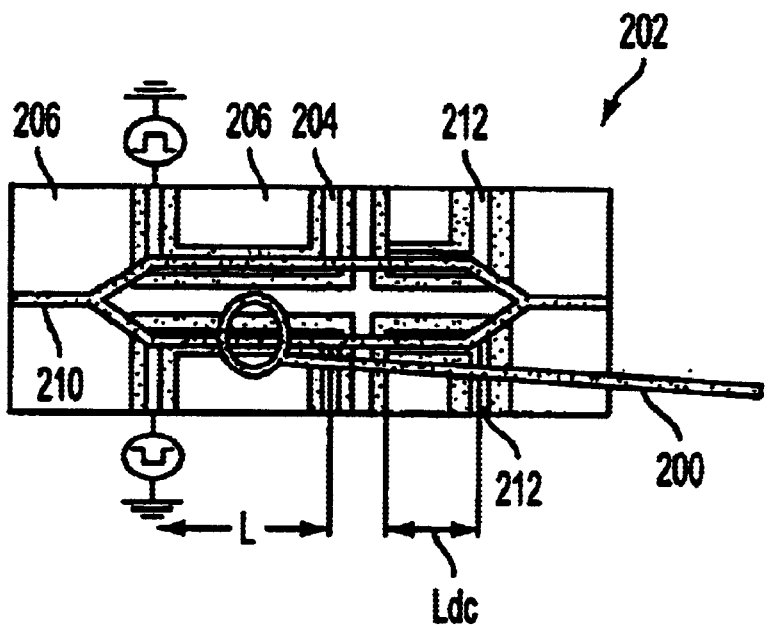
FIG. 25 is a diagram illustrating a top view of a dual-drive optical modulator, according to an embodiment of the present invention.
Figure 26:
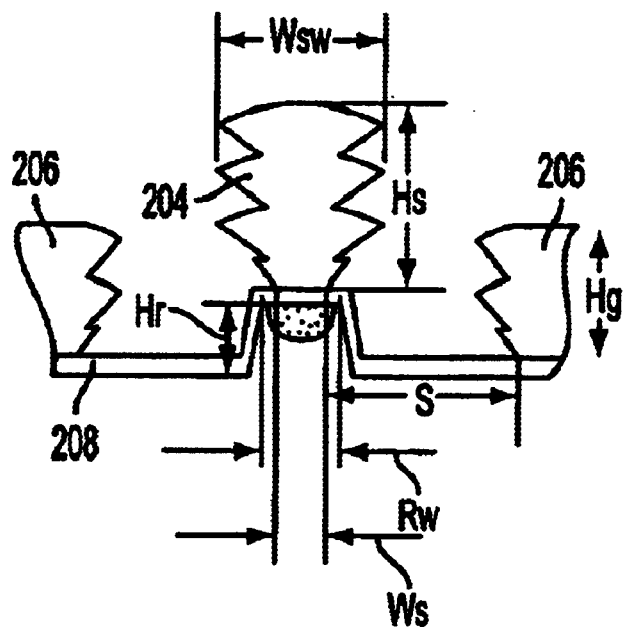
FIG. 26 is a diagram illustrating a cross section of an area of the optical modulator in FIG. 25, according to an embodiment of the present invention.

FIG. 25 is a diagram illustrating a top view of a dual-drive structure, according to an embodiment of the present invention. FIG. 26 is a diagram illustrating a cross section of area 200 in FIG. 25, according to an embodiment of the present invention. Referring now to FIGS. 25 and 26, the optical modulator 202 includes a signal electrode 204, ground electrodes 206, a buffer layer 208, an optical waveguide 210, and a DC bias electrode 212.

In the specific example of FIGS. 25 and 26, Ws=5–10 μm, Wsw=5–30 μm, and Rw=7–10 μm. Here, Ws is the width of the base of the signal electrode 204.

In this example, the signal electrode 204 is fabricated with four layers, and the ground electrodes 206 are fabricated with three layers. Because of the limitation of current electroplating, it is difficult to fabricate such thick electrodes with only one layer. Therefore, in this specific example, Hs=40 μm (4+12+12+12 μm), and Hg=28 μm (4+12+12 μm). However, the number of layers and the height of each layer are not limited to the specific example shown in FIGS. 25 and 26 because, generally, various characteristics of the optical modulator are not dependent on the numbers of layers and height. Generally, the total height (Hs+Hg) is important. Even so, the present invention is not limited to the specific example of total height shown in FIGS. 25 and 26.

Therefore, the measurements shown in FIGS. 25 and 26 are only intended to be example measurements, and the present invention is not limited to these specific measurements.

Figure 27:
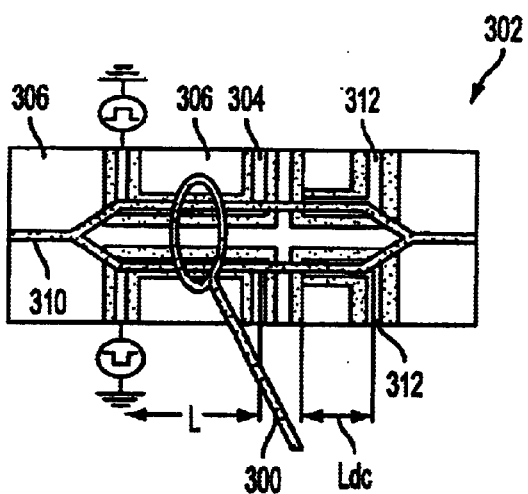
FIG. 27 is a diagram illustrating a top view of a dual-drive optical modulator, according to an additional embodiment of the present invention.
Figure 28:
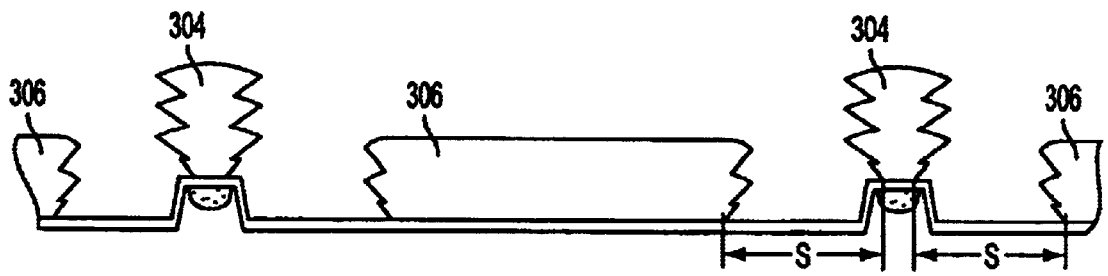
FIGS. 28, 29 and 30 are diagrams illustrating a cross section of an area in FIG. 27, for providing different structural configurations, respectively, according to embodiments of the present invention.
Figure 29:
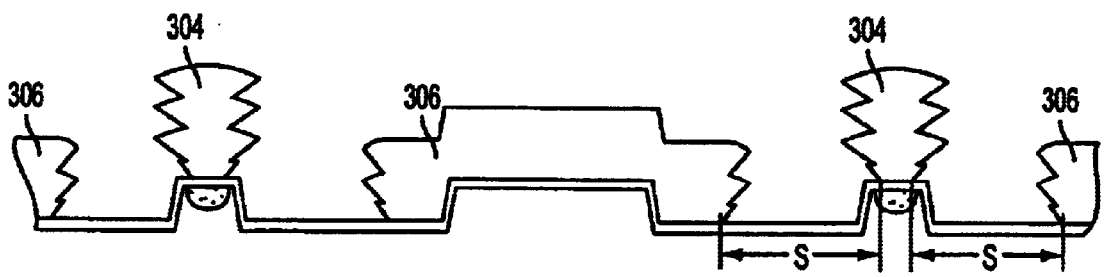
Figure 30:
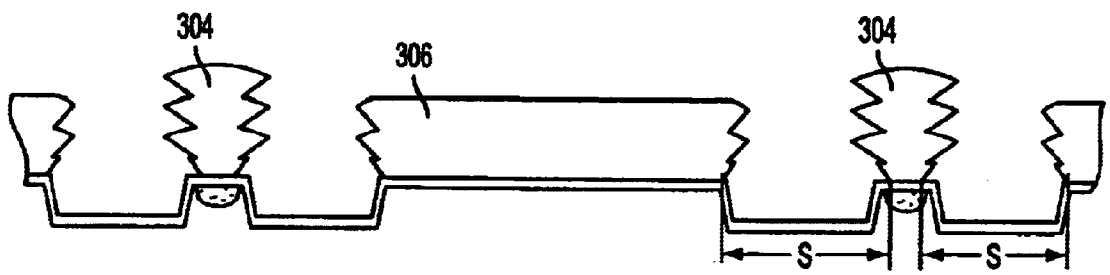

FIG. 27 is a diagram illustrating a top view of a dual-drive structure, according to an additional embodiment of the present invention. FIGS. 28, 29 and 30 are diagrams illustrating a cross section of area 300 in FIG. 27, for providing different structural configurations, respectively, according to embodiments of the present invention. Referring now to FIGS. 27, 28, 29 and 30, the optical modulator 302 includes a signal electrode 304, ground electrodes 306, an optical waveguide 310, and a DC bias electrode 312.

FIGS. 25, 26, 27, 28, 29 and 30 are intended as examples of dual-drive structures according to embodiments of the present invention. However, the present invention is not limited to these specific examples, and other variations are possible.

Figure 31:
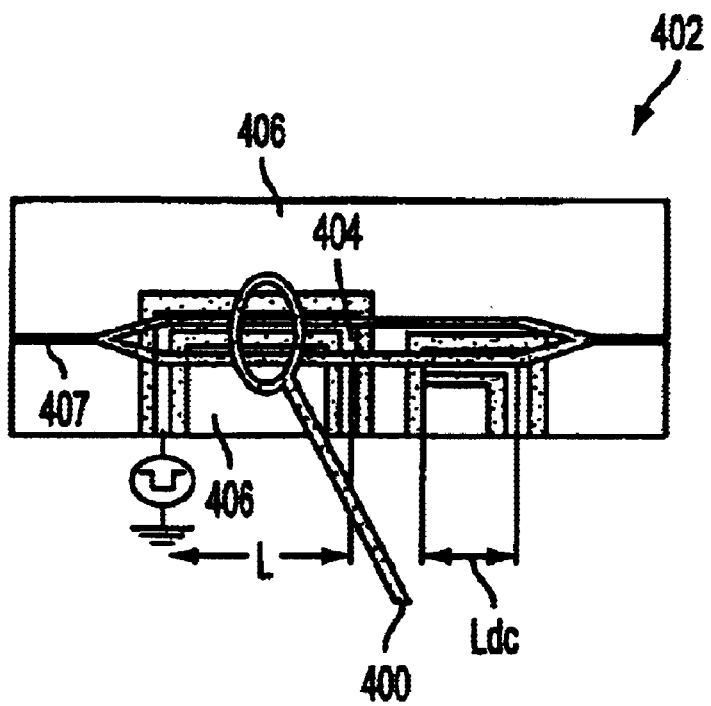
FIG. 31 is a diagram illustrating a top view of a single-drive optical modulator, according to an embodiment of the present invention.
Figure 32:
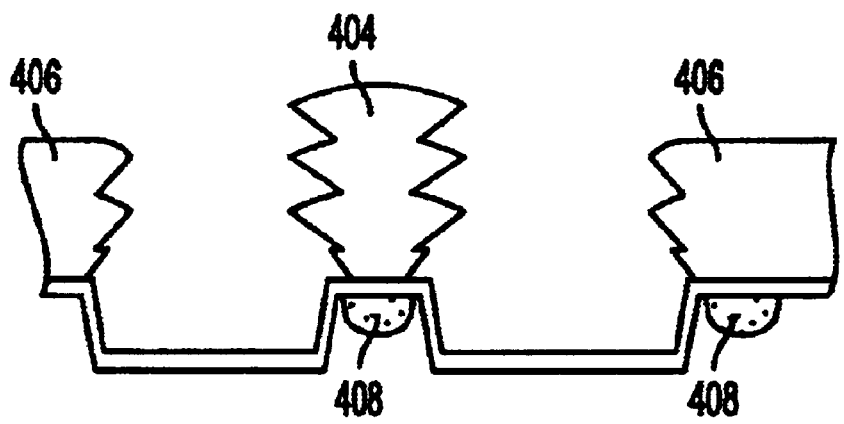
FIG. 32 is a diagram illustrating a cross section of an area in FIG. 31, according to an embodiment of the present invention.

FIG. 31 is a diagram illustrating a top view of a single-drive structure, according to an embodiment of the present invention. FIG. 32 is a diagram illustrating a cross section of area 400 in FIG. 31, according to an embodiment of the present invention. Referring now to FIGS. 31 and 32, the optical modulator 402 includes a signal electrode 404, ground electrodes 406, optical waveguide 407, and optical waveguides 408.

The drive voltage for a single-drive modulator would typically be larger than the drive voltage for a dual-drive modulator. For example, in various embodiments of the present invention, the drive voltage for a single-drive modulator might be, for example, 1.6 times larger than that for a dual-drive modulator. For example, the drive voltage for a dual-drive modulator might be 1.6 V, whereas the drive voltage for a single-drive modulator might be 2.6 V (which equals 1.6×1.6 V). In this example, 2.6 V represents the maximum drive voltage for the single drive modulator. Generally, drive voltage is dependent on bit rate. Therefore, the drive voltage of 1.6 V for a dual-drive modulator and 2.6 V for a single-drive modulator are based on a bit rate of 40 Gbps. Generally, if the bit rate is higher, the drive voltage is higher. However, the drive voltages described herein are only examples, and the present invention is not limited to any particular drive voltage for either single-drive or dual-drive modulators, or any relationship of drive voltages between single-drive and dual-drive modulators, or any particular drive voltage for a particular bit rate.

FIGS. 31 and 32 are intended as examples of a single-drive structure according to an embodiment of the present invention. However, the present invention is not limited to this specific example, and other variations are possible.

Various electrode shapes are shown in the various figures. However, the present invention is not limited to these specific shapes. Instead, various modifications are possible.

In various of the above embodiments of the present invention, the width of a signal electrode is approximately, for example, 7–8 μm. With the use of a ridge (see, for example, FIG. 2), the width of the ridge might be, for example 9 μm. Therefore, the width of the signal electrode is limited by the width of the ridge. For example, if the ridge has a maximum width of 9 μm, then 9 μm would be the maximum width for the signal electrode. However, if the width of the signal electrode is too small (for example, 4 μm), the electrical field in the optical waveguide might be too small. Accordingly, in a typical embodiment of the present invention, the signal electrode might have a width of, for example, 6–9 μm.

Moreover, according to above embodiments of the present invention, a gap width S exists between the ground electrode and the signal electrode. The signal electrode has a base with a width W. The ratio S/W is greater than or equal to 8.

Various measurements and values are described herein for specific example embodiments of the present invention. However, the present invention is not limited to these specific measurements and values. Instead, various different values can be used to achieve the desired operation.

Various embodiments of the present invention relate to the use of a ridge, such as, for example, the ridge 15 in FIG. 2. Generally, a ridge is a structure having an optical waveguide therein for changing the elevation of the optical waveguide with respect to portions of the substrate not having the optical waveguide, and having a signal electrode thereon. For example, in FIG. 2, the ridge 15 has the optical waveguide 11 therein, and changes the elevation of the optical waveguide 11 with respect to portions of the substrate not having the optical waveguide. Also, in FIG. 2, the ridge 15 has the signal electrode 12 thereon.

However, the present invention is not limited to a ridge having any specific shape. For example, FIG. 2 shows the ridge 15 rising at an angle of less than 90 degrees from the substrate. An angle of less than 90 degrees is often desirable for ease of manufacturing, but better operating characteristics can often be obtained if the ridge rises at right angles from the substrate, so that the ridge has a square or rectangular shape. However, the present invention is not limited to a ridge at any specific angle to the substrate. Moreover, the present invention is not limited to the ridge having any specific shape.

Generally, to provide good operating characteristics, the width of the ridge is wider than the width of the optical waveguide therein. However, the present invention is not limited to such an embodiments.

Optical modulators according to embodiments of the present invention are shown as having specific layers with specific characteristics and specific shapes. However, the present invention is not limited to the specific layers, characteristics or shapes shown in any specific example. Instead, various modifications can be made to achieve the desired operation. As an example, the signal and ground electrodes are not limited to being any particular shapes.

The present invention can be applied to an intensity modulator, such as, for example, a Mach Zehnder modulator, and also to a phase modulator.

Although not shown in various figures, various embodiments of the present invention might include an electrode for bias control. Various types of bias control can be implemented, and the present invention is not limited to any particular type of bias control. For example, a DC bias control electrode could be implemented, such as shown in FIGS. 25 and 27.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus comprising:
    an optical modulator comprising
        a ridge;
        a signal electrode on the ridge, the signal electrode having an interaction length which is at least 41 mm; and
        a ground electrode, wherein a gap width between the ground electrode and the signal electrode is at least 44 $\mu$m.

2. An apparatus as in claim 1, wherein the optical modulator has a single drive structure.

3. An apparatus as in claim 1, wherein the optical modulator has a single drive structure and the signal electrode is supplied with a drive voltage of at most 3.7 V.

4. An apparatus as in claim 1, wherein the optical modulator has a dual drive structure.

5. An apparatus as in claim 1, wherein the optical modulator has a dual drive structure, the signal electrode is supplied with a drive voltage of at most 1.7 V, the gap width is at least 56 $\mu$m, and the ground electrode has a thickness of at least 11 $\mu$m.

6. An apparatus as in claim 1, wherein the signal electrode is supplied with a drive voltage of at most 1.5 V, the gap width is at least 62 $\mu$m, and the ground electrode has a thickness of at least 28 $\mu$m.

7. An apparatus as in claim 1, wherein the ground electrode has a thickness of at most 50 $\mu$m.

8. An apparatus as in claim 1, wherein the optical modulator is a 40 Gbps optical modulator.

9. An apparatus as in claim 2, wherein the optical modulator is a 40 Gbps optical modulator.

10. An apparatus as in claim 3, wherein the optical modulator is a 40 Gbps optical modulator.

11. An apparatus as in claim 4, wherein the optical modulator is a 40 Gbps optical modulator.

12. An apparatus as in claim 5, wherein the optical modulator is a 40 Gbps optical modulator.

13. An apparatus as in claim 6, wherein the optical modulator is a 40 Gbps optical modulator.

14. An apparatus as in claim 1, wherein the optical modulator further comprises a $LiNbO_3$ substrate on which the optical modulator is based.

15. An apparatus as in claim 1, wherein the optical modulator comprises a z-cut $LiNbO_3$ substrate on which the optical modulator is based.

16. An apparatus as in claim 2, wherein the optical modulator further comprises a $LiNbO_3$ substrate on which the optical modulator is based.

17. An apparatus as in claim 2, wherein the optical modulator comprises a z-cut $LiNbO_3$ substrate on which the optical modulator is based.

18. An apparatus as in claim 4, wherein the optical modulator further comprises a $LiNbO_3$ substrate on which the optical modulator is based.

19. An apparatus as in claim 4, wherein the optical modulator comprises a z-cut $LiNbO_3$ substrate on which the optical modulator is based.

20. An apparatus as in claim 8, wherein the optical modulator further comprises a $LiNbO_3$ substrate on which the optical modulator is based.

21. An apparatus as in claim 8, wherein the optical modulator comprises a z-cut $LiNbO_3$ substrate on which the optical modulator is based.

22. An apparatus as in claim 1, wherein the optical modulator further comprises:
    a buffer layer between the signal electrode and the ridge.

23. An optical modulator for optically modulating a light, comprising
    a substrate;
    an optical waveguide through which the light travels;
    a ridge changing an elevation of the optical waveguide with respect to the substrate;
    a ground electrode;
    a signal electrode on the ridge, a gap width between the ground electrode and the signal electrode being at least 44 $\mu$m, the signal electrode having an interaction length with respect to the optical waveguide of at least 41 mm, a drive signal supplied to the signal electrode causing an electric field to be produced along the optical waveguide as the light travels through the optical waveguide, to optically modulate the light.

24. An optical modulator as in claim 23, wherein the optical modulator has a single drive structure.

25. An optical modulator as in claim 23, wherein the optical modulator has a single drive structure and the signal electrode is supplied with a drive signal having a voltage of at most 3.7 V.

26. An optical modulator as in claim 23, wherein the optical modulator has a dual drive structure.

27. An optical modulator as in claim 23, wherein the optical modulator has a dual drive structure, the signal electrode is supplied with a drive signal having a voltage of at most 1.7 V, the gap width is at least 56 μm, and the ground electrode has a thickness of at least 11 μm.

28. An optical modulator as in claim 23, wherein the signal electrode is supplied with a drive signal having a voltage of at most 1.5 V, the gap width is at least 62 μm, and the ground electrode has a thickness of at least 28 μm.

29. An optical modulator as in claim 23, wherein the ground electrode has a thickness of at most 50 μm.

30. An optical modulator as in claim 23, wherein the optical modulator is a 40 Gbps optical modulator.

31. An optical modulator as in claim 24, wherein the optical modulator is a 40 Gbps optical modulator.

32. An optical modulator as in claim 25, wherein the optical modulator is a 40 Gbps optical modulator.

33. An optical modulator as in claim 26, wherein the optical modulator is a 40 Gbps optical modulator.

34. An optical modulator as in claim 27, wherein the optical modulator is a 40 Gbps optical modulator.

35. An optical modulator as in claim 28, wherein the optical modulator is a 40 Gbps optical modulator.

36. An optical modulator as in claim 23, wherein the substrate is a LiNbO$_3$ substrate.

37. An optical modulator as in claim 23, wherein the substrate is a z-cut LiNbO$_3$ substrate.

38. An optical modulator as in claim 24, wherein the substrate is a LiNbO$_3$ substrate.

39. An optical modulator as in claim 24, wherein the substrate is a z-cut LiNbO$_3$ substrate.

40. An optical modulator as in claim 26, wherein the substrate is a LiNbO$_3$ substrate.

41. An optical modulator as in claim 26, wherein the substrate is a z-cut LiNbO$_3$ substrate.

42. An optical modulator as in claim 30, wherein the substrate is a LiNbO$_3$ substrate.

43. An optical modulator as in claim 30, wherein the substrate is a z-cut LiNbO$_3$ substrate.

44. An optical modulator as in claim 23, further comprising:
a buffer layer between the signal electrode and the ridge.

45. An optical modulator for optically modulating a light, comprising
a substrate;
an optical waveguide through which the light travels;
a ridge changing an elevation of the optical waveguide with respect to the substrate;
first and second ground electrodes;
a signal electrode on the ridge and positioned between the first and second ground electrodes, a gap width between the first ground electrode and the signal electrode, and between the second ground electrode and the signal electrode, being at least 44 μm, the signal electrode having an interaction length with respect to the optical waveguide of at least 41 mm, a drive signal supplied to the signal electrode causing an electric field to be produced along the optical waveguide as the light travels through the optical waveguide, to optically modulate the light.

46. An optical modulator as in claim 45, wherein the optical modulator has a single drive structure.

47. An optical modulator as in claim 45, wherein the optical modulator has a single drive structure and the signal electrode is supplied with a drive signal having a voltage of at most 3.7 V.

48. An optical modulator as in claim 45, wherein the optical modulator has a dual drive structure.

49. An optical modulator as in claim 45, wherein the optical modulator has a dual drive structure, the signal electrode is supplied with a drive signal having a voltage of at most 1.7 V, the gap width is at least 56 μm, and the first and second ground electrodes each have a thickness of at least 11 μm.

50. An optical modulator as in claim 45, wherein the signal electrode is supplied with a drive signal having a voltage of at most 1.5 V, the gap width is at least 62 μm, and the first and second ground electrodes each have a thickness of at least 28 μm.

51. An optical modulator as in claim 45, wherein the first and second ground electrodes each have a thickness of at most 50 μm.

52. An optical modulator as in claim 45, wherein the optical modulator is a 40 Gbps optical modulator.

53. An optical modulator as in claim 46, wherein the optical modulator is a 40 Gbps optical modulator.

54. An optical modulator as in claim 47, wherein the optical modulator is a 40 Gbps optical modulator.

55. An optical modulator as in claim 48, wherein the optical modulator is a 40 Gbps optical modulator.

56. An optical modulator as in claim 49, wherein the optical modulator is a 40 Gbps optical modulator.

57. An optical modulator as in claim 50, wherein the optical modulator is a 40 Gbps optical modulator.

58. An optical modulator as in claim 45, wherein the substrate is a LiNbO$_3$ substrate.

59. An optical modulator as in claim 45, wherein the substrate is a z-cut LiNbO$_3$ substrate.

60. An optical modulator as in claim 46, wherein the substrate is a LiNbO$_3$ substrate.

61. An optical modulator as in claim 46, wherein the substrate is a z-cut LiNbO$_3$ substrate.

62. An optical modulator as in claim 48, wherein the substrate is a LiNbO$_3$ substrate.

63. An optical modulator as in claim 48, wherein the substrate is a z-cut LiNbO$_3$ substrate.

64. An optical modulator as in claim 52, wherein the substrate is a LiNbO$_3$ substrate.

65. An optical modulator as in claim 52, wherein the substrate is a z-cut LiNbO$_3$ substrate.

66. An optical modulator as in claim 45, further comprising:
a buffer layer between the signal electrode and the ridge.

67. An optical modulator for optically modulating a light, comprising
a z-cut LiNbO$_3$ substrate;
an optical waveguide through which the light travels;
a ridge changing an elevation of the optical waveguide with respect to the substrate;
first and second ground electrodes;
a signal electrode on the ridge and positioned between the first and second ground electrodes, a gap width between the first ground electrode and the signal electrode, and between the second ground electrode and the signal electrode, being at least 44 μm, the signal electrode having an interaction length with respect to the optical waveguide of at least 41 mm; and
a buffer layer between the signal electrode and the ridge, wherein a drive signal supplied to the signal electrode causes an electric field to be produced along the optical waveguide as the light travels through the optical waveguide, to optically modulate the light.

68. An optical modulator as in claim 67, wherein the optical modulator has one of the group consisting of a single drive structure and a dual drive structure.

69. An optical modulator as in claim 67, wherein the optical modulator is a 40 Gbps optical modulator.

70. An optical modulator as in claim 68, wherein the optical modulator is a 40 Gbps optical modulator.

71. An optical modulator comprising a crystal substrate that exhibits an electro-optic effect;

an optical waveguide through which a light travels;

a ridge changing an elevation of the optical waveguide with respect to the substrate;

first and second ground electrodes;

a signal electrode on the ridge and between the first and second ground electrodes, a gap width between the signal electrode and the first ground electrode, and between the signal electrode and the second ground electrode, being at least 44 $\mu$m, the signal electrode having an interaction length with respect to the optical waveguide of at least 41 mm, wherein the light traveling through the optical waveguide is phase-matched with a microwave signal traveling through the signal electrode, and characteristic impedance of the signal electrode is set within a range where microwave reflection is limited below a predetermined level, to thereby optically modulate the light.

72. An optical modulator as in claim 71, wherein the optical modulator has one of the group consisting of a single drive structure and a dual drive structure.

73. An optical modulator as in claim 71, wherein the optical modulator is a 40 Gbps optical modulator.

74. An optical modulator as in claim 72, wherein the optical modulator is a 40 Gbps optical modulator.

75. An optical modulator as in claim 71, wherein the substrate is a $LiNbO_3$ substrate.

76. An optical modulator as in claim 71, wherein the substrate is a z-cut $LiNbO_3$ substrate.

77. An optical modulator as in claim 72, wherein the substrate is a $LiNbO_3$ substrate.

78. An optical modulator as in claim 72, wherein the substrate is a z-cut $LiNbO_3$ substrate.

79. An optical modulator as in claim 71, further comprising:

a buffer layer between the signal electrode and the ridge.

80. An optical modulator comprising a z-cut $LiNbO_3$ substrate;

an optical waveguide through which a light travels;

a ridge changing an elevation of the optical waveguide with respect to the substrate;

first and second ground electrodes;

a signal electrode on the ridge and between the first and second ground electrodes, a gap width between the signal electrode and the first ground electrode, and between the signal electrode and the second ground electrode, being at least 44 $\mu$m, the signal electrode having an interaction length with respect to the optical waveguide of at least 41 mm, and a buffer layer between the signal electrode and the ridge, wherein the light traveling through the optical waveguide is phase-matched with a microwave signal traveling through the signal electrode, and characteristic impedance of the signal electrode is set within a range where microwave reflection is limited below a predetermined level, to thereby optically modulate the light.

81. An optical modulator as in claim 80, wherein the optical modulator has one of the group consisting of a single drive structure and a dual drive structure.

82. An optical modulator as in claim 80, wherein the optical modulator is a 40 Gbps optical modulator.

83. An optical modulator as in claim 81, wherein the optical modulator is a 40 Gbps optical modulator.

* * * * *

UNITED STATES PATENT AND TRADEMARK OFFICE
CERTIFICATE OF CORRECTION

PATENT NO.   : 6,721,085 B2
DATED        : April 13, 2004
INVENTOR(S)  : Masaki Sugiyama et al.

It is certified that error appears in the above-identified patent and that said Letters Patent is hereby corrected as shown below:

<u>Title page,</u>
Item [56], References Cited, OTHER PUBLICATIONS, "Sugiyama, Masak, et al.," reference, please change "Masak, et al." to -- Masaki, et al. --.

Signed and Sealed this

Thirtieth Day of November, 2004

JON W. DUDAS
*Director of the United States Patent and Trademark Office*